(12) United States Patent
Rouleau et al.

(10) Patent No.: US 11,384,814 B2
(45) Date of Patent: Jul. 12, 2022

(54) COMPLIANT HANGER ASSEMBLY

(71) Applicant: Panduit Corp., Tinley Park, IL (US)

(72) Inventors: Rodney G. Rouleau, Manhattan, IL (US); Michael B. Verbeek, Crown Point, IN (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 17/010,375

(22) Filed: Sep. 2, 2020

(65) Prior Publication Data
US 2021/0324939 A1 Oct. 21, 2021

Related U.S. Application Data

(60) Provisional application No. 63/010,210, filed on Apr. 15, 2020.

(51) Int. Cl.
*F16G 11/10* (2006.01)
*F16G 11/14* (2006.01)

(52) U.S. Cl.
CPC ............ *F16G 11/108* (2013.01); *F16G 11/14* (2013.01)

(58) Field of Classification Search
CPC ............................... F16G 11/108; F16G 11/14
See application file for complete search history.

(56) References Cited

U.S. PATENT DOCUMENTS

| 3,483,910 | A | 12/1969 | La Londe et al. |
| 3,493,025 | A | 2/1970 | La Londe et al. |
| 4,146,074 | A | 3/1979 | Kowalski |
| 4,486,133 | A | 12/1984 | Pletcher |
| 4,542,871 | A | 9/1985 | Fortsch |
| 4,645,393 | A | 2/1987 | Pletcher |
| 4,666,355 | A * | 5/1987 | Stover .................. F16B 37/046 411/104 |
| 4,830,531 | A | 5/1989 | Condit et al. |
| 5,067,863 | A * | 11/1991 | Kowalski ............... H02G 3/263 411/85 |
| 5,169,100 | A | 12/1992 | Milcent et al. |
| 5,209,619 | A | 5/1993 | Rinderer |
| 5,411,356 | A * | 5/1995 | Travis ..................... F16L 3/12 411/85 |
| 5,489,173 | A | 2/1996 | Hofle |
| 5,628,598 | A * | 5/1997 | Hofle ................... F16B 37/045 411/85 |
| 5,653,409 | A | 8/1997 | White, Jr. et al. |
| 6,102,347 | A | 8/2000 | Benoit |
| 6,386,809 | B2 | 5/2002 | Ikuta |
| 6,582,170 | B2 | 6/2003 | Dinh et al. |
| 6,846,140 | B2 * | 1/2005 | Anderson ............. B60P 7/0815 410/102 |

(Continued)

FOREIGN PATENT DOCUMENTS

| DE | 3823000 A1 | 1/1990 |
| DE | 29717218 U1 | 11/1997 |

(Continued)

*Primary Examiner* — David M Upchurch
(74) *Attorney, Agent, or Firm* — Christopher S. Clancy; James H. Williams; Peter S. Lee

(57) ABSTRACT

A compliant hanger assembly is disclosed for installation onto a strut channel. With the installation of the compliant hanger assembly, the simple and effective use of a metal ball locking cable tie is made available to attach components (e.g., cables) onto the strut.

20 Claims, 25 Drawing Sheets

(56) References Cited

U.S. PATENT DOCUMENTS

| | | | |
|---|---|---|---|
| 7,175,377 B2 * | 2/2007 | Womack | B60P 7/0815 |
| | | | 410/104 |
| 7,600,724 B2 | 10/2009 | Nelson et al. | |
| 7,874,774 B2 * | 1/2011 | Peterson | B60P 7/0815 |
| | | | 410/104 |
| 8,028,962 B2 | 10/2011 | Geiger | |
| 8,132,992 B2 | 3/2012 | Van Walraven | |
| 8,936,221 B2 | 1/2015 | Rouleau et al. | |
| D721,952 S | 2/2015 | Parthibhan et al. | |
| 9,103,365 B2 | 8/2015 | Whipple et al. | |
| 9,194,418 B2 * | 11/2015 | Parthibhan | F16B 37/046 |
| 9,341,206 B2 | 5/2016 | Rouleau et al. | |
| 10,266,122 B2 | 4/2019 | Rouleau et al. | |
| 10,302,249 B1 * | 5/2019 | Kelly | F16B 2/12 |
| 10,520,113 B1 * | 12/2019 | Thompson | F16B 2/06 |
| 2003/0089828 A1 * | 5/2003 | Korczak | F16B 37/02 |
| | | | 248/68.1 |
| 2003/0185643 A1 * | 10/2003 | Thompson | F16B 37/046 |
| | | | 411/85 |
| 2004/0131439 A1 * | 7/2004 | Womack | B61D 45/001 |
| | | | 410/104 |
| 2015/0233410 A1 | 8/2015 | Parthibhan et al. | |
| 2018/0035650 A1 * | 2/2018 | Ellis | B33Y 80/00 |
| 2019/0218006 A1 | 7/2019 | Matz | |
| 2020/0080664 A1 * | 3/2020 | Perry | F16L 3/24 |

FOREIGN PATENT DOCUMENTS

| | | |
|---|---|---|
| EP | 1026415 A2 | 8/2000 |
| EP | 1772935 A2 | 4/2007 |
| GB | 2399154 A | 9/2004 |

\* cited by examiner

COMPLIANT HANGER ASSEMBLY

CROSS-REFERENCE TO RELATED APPLICATION(S)

This application claims benefit to U.S. Provisional Patent Application No. 63/010,210, filed on Apr. 15, 2020, the entirety of which is hereby incorporated by reference herein.

FIELD OF TECHNOLOGY

This disclosure relates to a compliant hanger assembly for installation onto a strut channel. With the installation of the compliant hanger assembly, the simple and effective use of a metal ball locking cable tie is made available to attach components (e.g., cables) onto the strut.

BACKGROUND

Metal ball locking cable ties (MLTs) offer a simple, effective, and fast solution for securing components, such as cables. An exemplary MLT 50 is illustrated in FIG. 15. The MLT 50 is comprised of a cable tie body 51 and a locking head 52. Inside the locking head 52 is a ball bearing 53 that moves in either an anti-tensioning direction or tensioning direction to perform a self-locking mechanism of the MLT 50, as shown in the partial internal view of FIG. 15 representing the movement of the ball bearing 53 inside of the locking head 52 of the MLT 50. During a cable tie tensioning operation where the cable tie body 51 is tightened around one or more cables, the ball bearing 53 is configured to move within the locking head 52 to the tensioning position. When the ball bearing 53 is in the tensioning position shown in FIG. 15, the cable tie body 51 is allowed to freely move in the tightening direction to contract around the cables being secured (i.e., the tensioning movement). When the cable tie body 51 has sufficiently secured the cables by contracting around the cables to a desired tensioning amount, the tension on the cable tie body 51 from pulling it in the tensioning direction is released and the ball bearing 53 is allowed to travel a short distance in the opposition direction to abut against an internal surface of the locking head 52 (i.e., the anti-tensioning movement) and prevent further release of the cable tie body 51. This is the locking position shown in FIG. 15. The tensioning force applied against the cable tie body 51 from the cables being secured provides the self-locking mechanism as the ball bearing 53 is locked within the locking head 52 in the locking position, and prevents further movement of the cable tie body 51 in the anti-tensioning direction.

The MLT 50 offers a quick, easy, and effective solution for securing cables in a variety of environments. However, the MLT 50 installation process requires a short compression and expansion to allow the ball bearing 53 to travel from the tensioning position to the locking position and be effective in securing the cables.

SUMMARY

This disclosure relates to a compliant hanger assembly for installation within a strut channel. With the installation of the compliant hanger assembly, the simple and effective use of a metal ball locking cable tie is made available to attach components (e.g., cables) onto the strut.

According to an embodiment, a compliant hanger assembly is disclosed. The compliant hanger assembly comprises a top hanger, a compliant member, and a strut nut, wherein the compliant member is positioned on top of the strut nut to be between the top hanger and the strut nut.

According to an alternative embodiment, a compliant hanger assembly is disclosed. The compliant hanger assembly comprises a hyperbolic strut nut, a compression pad, and a strut nut, wherein the compression pad is positioned on top of the strut nut and contacts a portion of a strut when the compliant hanger assembly is installed onto the strut.

According to an alternative embodiment, a compliant hanger assembly is disclosed. The compliant hanger assembly comprises a top hanger, a compliant member, and a strut nut, wherein the compliant member is positioned on top of the strut nut to be between the top hanger and the strut nut, wherein the compliant member comprises a flat component configured to lay on top of the strut nut, a first side skirt configured to cover a first side surface of the strut nut, and a second side skirt configured to cover a second side surface of the strut nut.

DETAILED DESCRIPTION

This disclosure describes embodiments of a compliant hanger assembly for installation onto a strut. The compliant hanger assembly is installed onto the strut to offer compression characteristics for enabling the effective use of a metal ball locking cable tie that may be used to efficiently and effectively secure cables, or other components, to the strut. The compliant hanger includes a compliant member that may take the form of a compression pad or compression (partial or complete) covering according to different embodiments.

Figure 1:
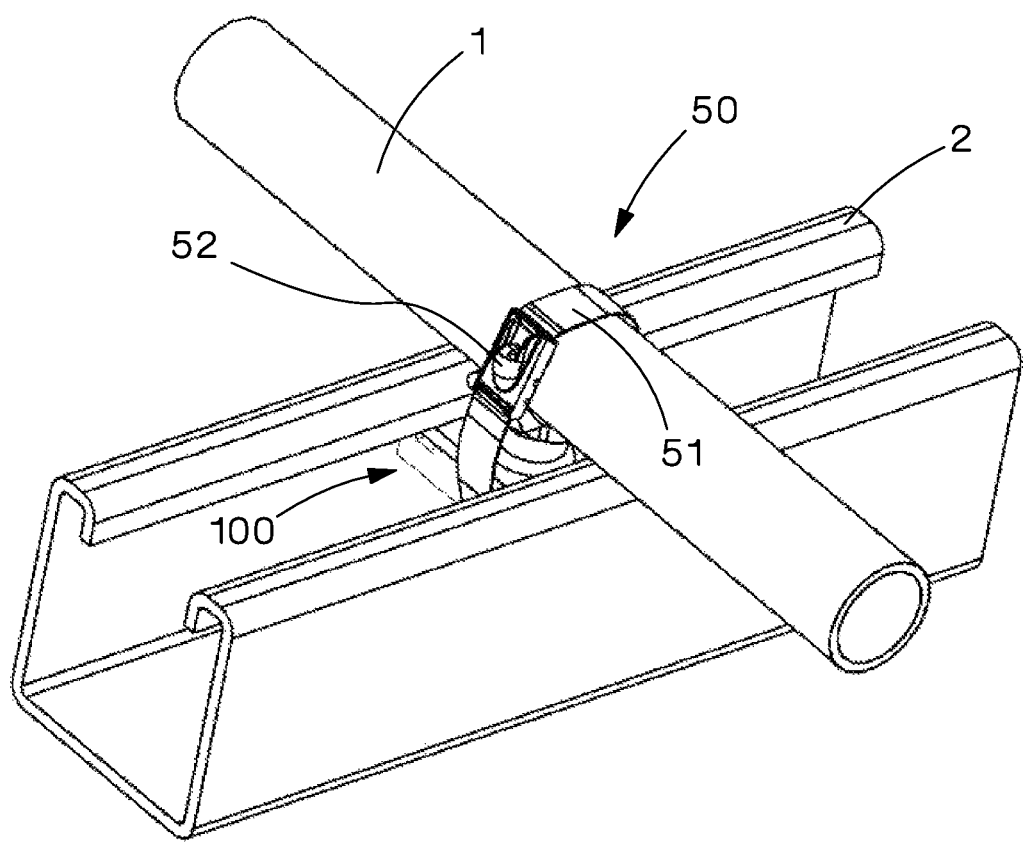
FIG. 1 is a front perspective view of an exemplary cable securing system including a compliant hanger assembly installed onto a strut for securing a cable to the strut, according to an embodiment.
Figure 15:
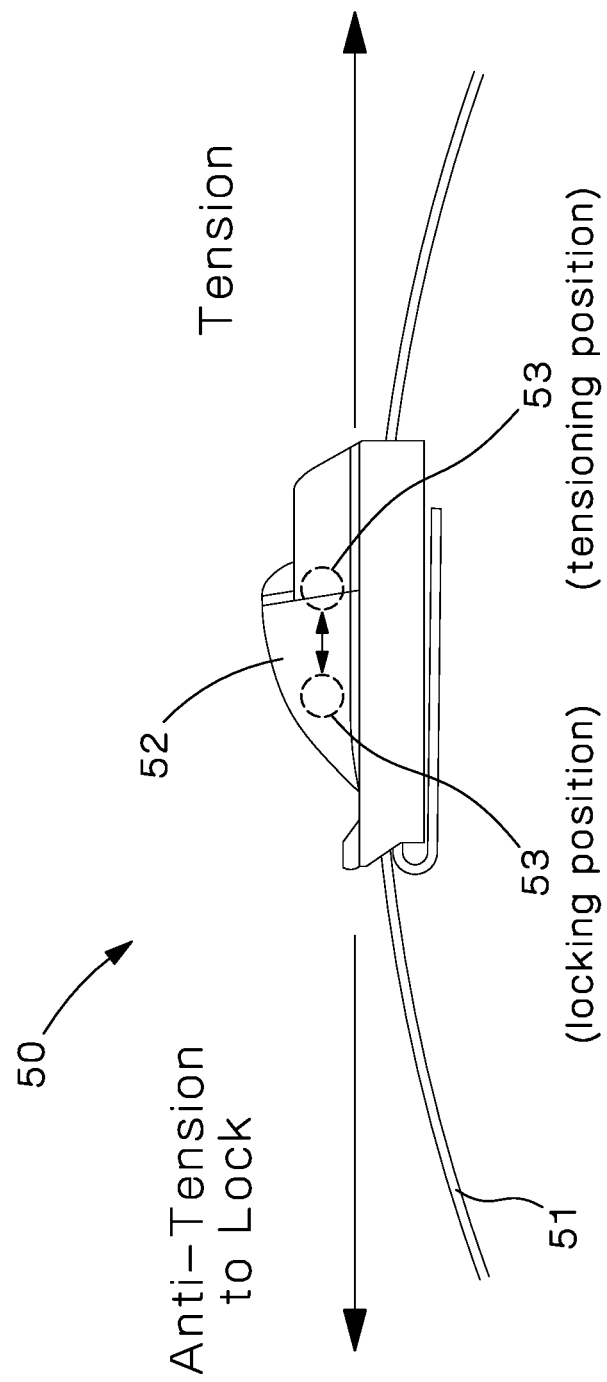
FIG. 15 is partial enlarged view of a metal ball locking cable tie.

FIG. 1 illustrates an exemplary cable securing system for using a compliant hanger assembly 100 and a metal ball locking cable tie (MLT) 50 to secure a cable 1 onto a strut 2. The MLT 50 includes a cable tie body 51 and a locking head 52, where the MLT 50 operates as described with reference to FIG. 15. The compliant hanger assembly 100 includes a compliant component that offers a novel solution to providing the compression and expansion rebound for effectively utilizing the MLT 50 to secure the cable 1 to the strut 2. Although the described embodiments use the cable 1 as the exemplary bundled component secured to the strut 2, other components that fit within the dimensions of the MLT 50 may instead replace the cable 1 and be secured to the strut 2 according to various embodiments.

Figure 2:
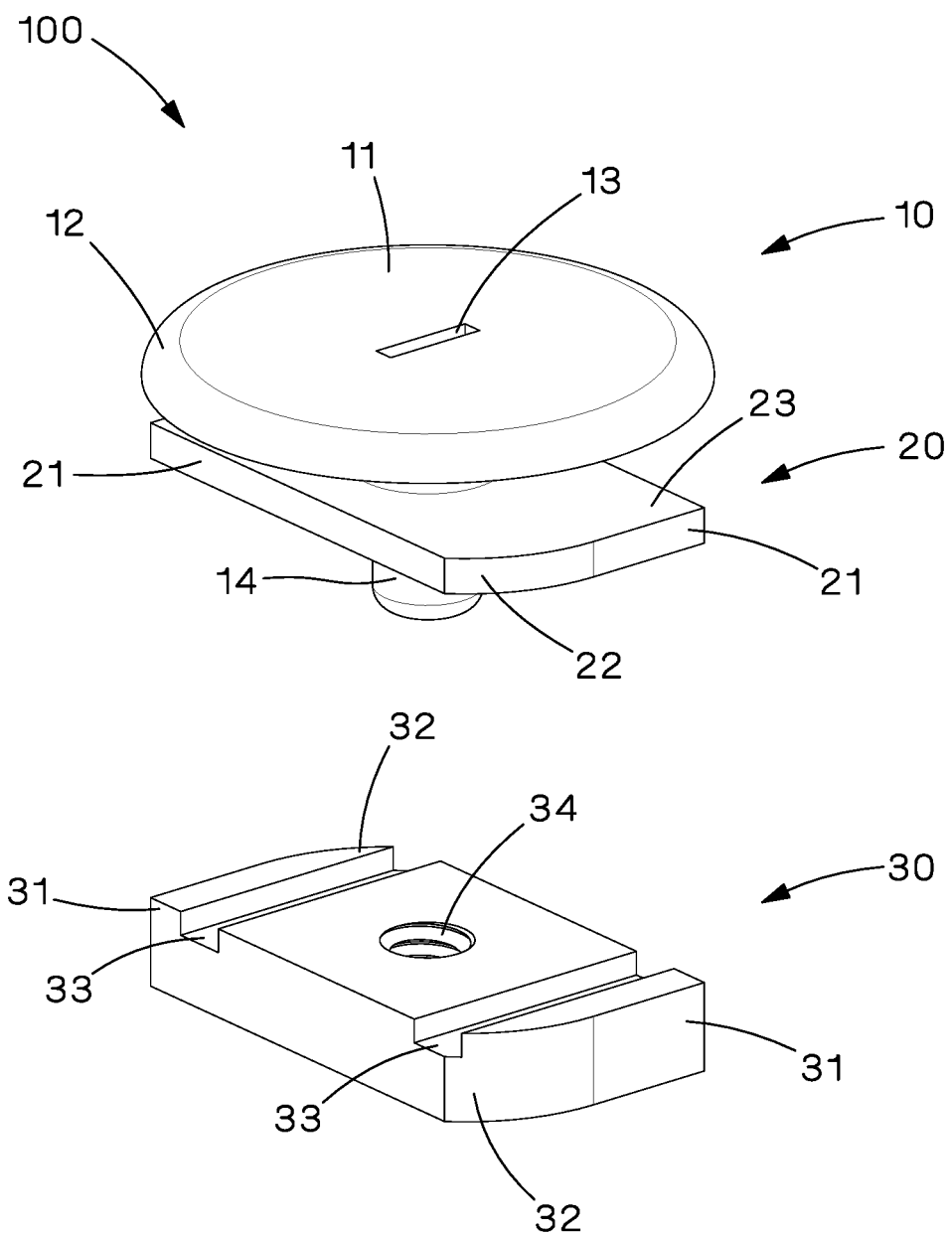
FIG. 2 is an exploded view of compliant hanger assembly shown in FIG. 1.

FIG. 2 illustrates an exploded view of the compliant hanger assembly 100. The compliant hanger assembly 100 includes a top hanger 10 and a compression pad 20 (i.e., the compliant member), and a strut nut 30. The top hanger 10 is comprised of a top head 12 and a stem 14. The top head 12 is formed to include a flat top surface 11 upon which the cable 1 will sit on top of when secured using the MLT 50. According to other embodiments, the shape of the flat top surface 11 may be replaced with a curved concave shape to receive and better match the curvature of the cable(s) being secured to it.

Figure 6:
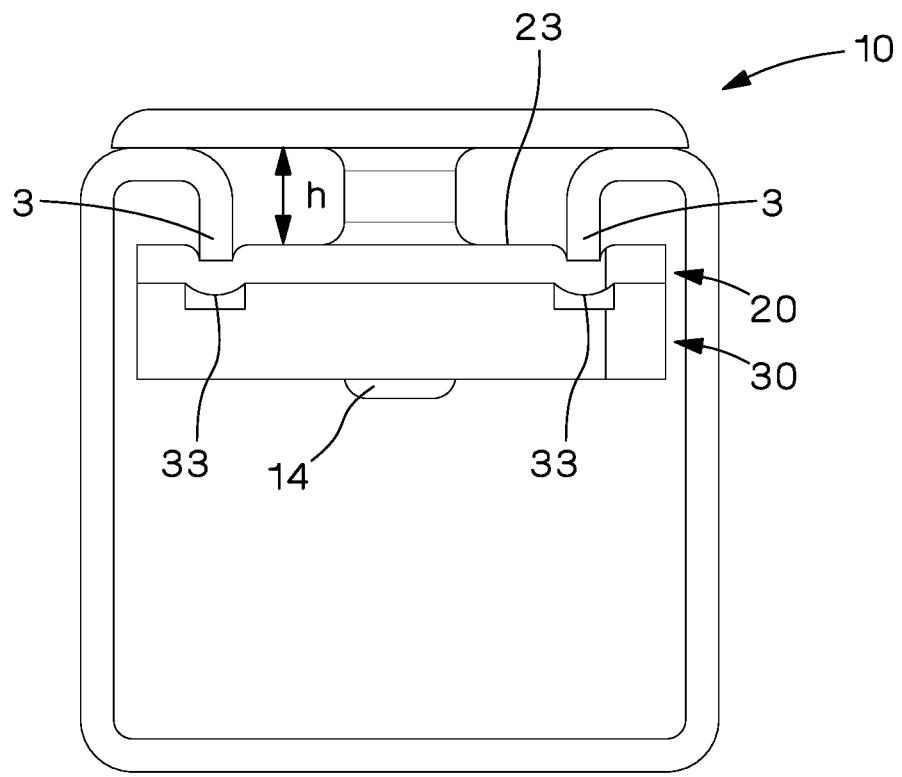
FIG. 6 is a first side view of the compliant hanger assembly shown in FIG. 4 in an installed state onto the strut.
Figure 8:
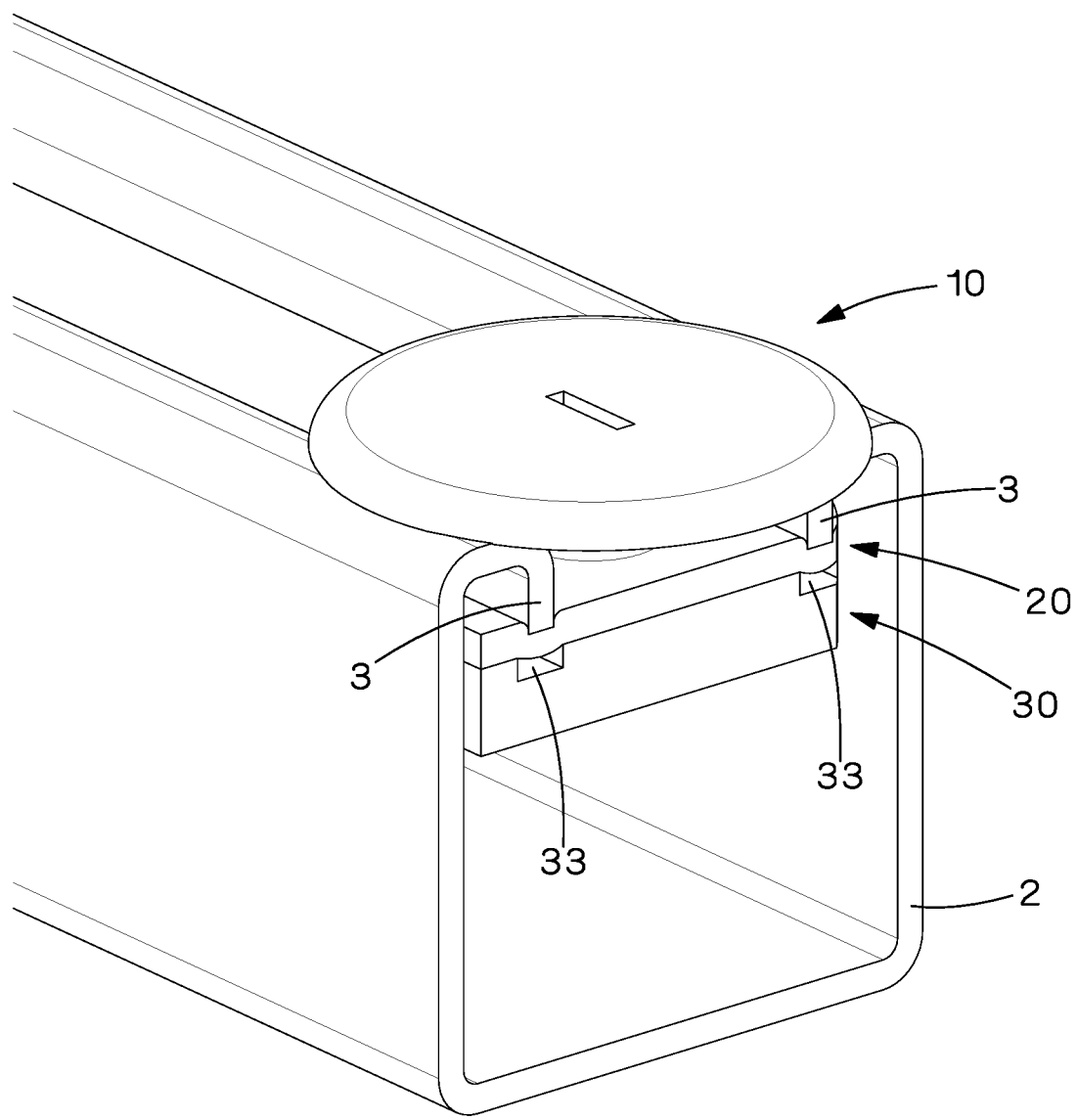
FIG. 8 is a perspective view of the compliant hanger assembly in the installed state onto the strut corresponding to FIG. 6.

The top head 12 also includes a driver opening 13 having a shape for receiving a driving tool that applies a rotational torque. The rotational torque applied to the driver opening 13 may translate down to rotate the stem 14 of the top hanger 10 and secure it into a threaded hole 34 of the strut nut 30. The rotational torque applied to the driver opening 13 may further translate to rotate the assembled compliant hanger assembly 100 into an installed state onto the strut 2, as shown in FIGS. 6 and 8. The stem 14 may be threaded or unthreaded according to some embodiments, where the stem 14 has a diameter that securely fits into the diameter of the threaded hole 34 of the strut nut 30 (e.g., the diameter of the stem 14 is slightly larger than the diameter of the threaded hole 34). With these relative dimensions, the interaction of the stem 14 and the threaded hole 34 as the stem 14 is inserted into the threaded hole 34 keeps the top hanger 10 attached to the strut nut 30.

Although the driver opening 13 shown in FIG. 2 is in the slotted shape, other shapes for receiving different driver heads are also within the scope of this disclosure, including, but not limited to, a phillips shaped opening, a tri-wing shaped opening, an allen shaped opening, a square shaped opening, a torx shaped opening, a clutch shaped opening, a spanner shaped opening, a schrader shaped opening, or other shaped opening. The top hanger 10 is shown to have a rounded curb edge around the perimeter of the flat top surface 11, although a flat edge may be used in other embodiments. The top hanger 10 is made from a plastic, or other polymer material.

The compression pad 20 is secured to the stem 14 by, for example, a friction fit, over-molding, glue, adhesive, or other adhesion technique. According to some embodiments, the top hanger 10, stem 14, and the compression pad 20 may be manufactured (e.g., molded) as a single piece. The compression pad 20 is made from a material with physical characteristics that provides reboundable compression when the MLT 50 is being tensioned to secure the cable 1, and rebounding expansion that recovers at least some of its shape to provide the anti-tension in the MLT 50 that activates the locking mechanism of the MLT 50 and prevents further loosening of the cable tie body 51. It follows that the compression pad 20 is comprised of at least one of a foam material, polymer composition, rubber composition, other deformable and rebounding material, or a combination thereof.

The compression pad 20 has a flat top surface 23, and the compression pad 20 has a substantially rectangular shape to match the shape of the strut nut 30. The compression pad 20 includes rounded corners 22 at two diagonally opposite corners, and orthogonal edged corners 21 at the other two diagonally opposite corners.

The strut nut 30 includes the threaded hole 34 for receiving the stem 14 of the top hanger 10. The strut nut 30 also has the substantially rectangular shape, which is followed by the compression pad 20. So the strut nut 30 includes rounded corners 32 at two diagonally opposite corners, and orthogonal edged corners 31 at the other two diagonally opposite corners. The rounded corners 22 of the compression pad 20 and the rounded corners 32 of the strut nut 30 are designed to make installation onto the strut 2 more efficient as the compliant hanger assembly 100 is rotated into an installed state onto the strut 2, as will be described in more detail below. The strut nut 30 further includes dual channels 33, where the dual channels 33 are positioned and shaped to receive the dual installation protrusions 3 of the strut 2, as shown in FIGS. 6 and 8.

Figure 3:
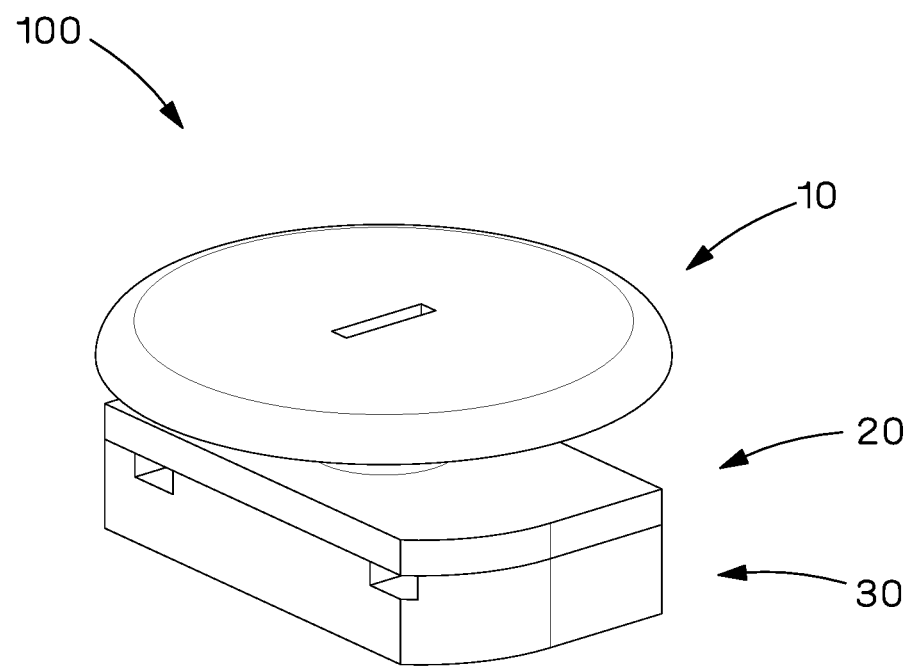
FIG. 3 is a perspective view of the compliant hanger assembly shown in FIG. 1 in an assembled state.
Figure 4:
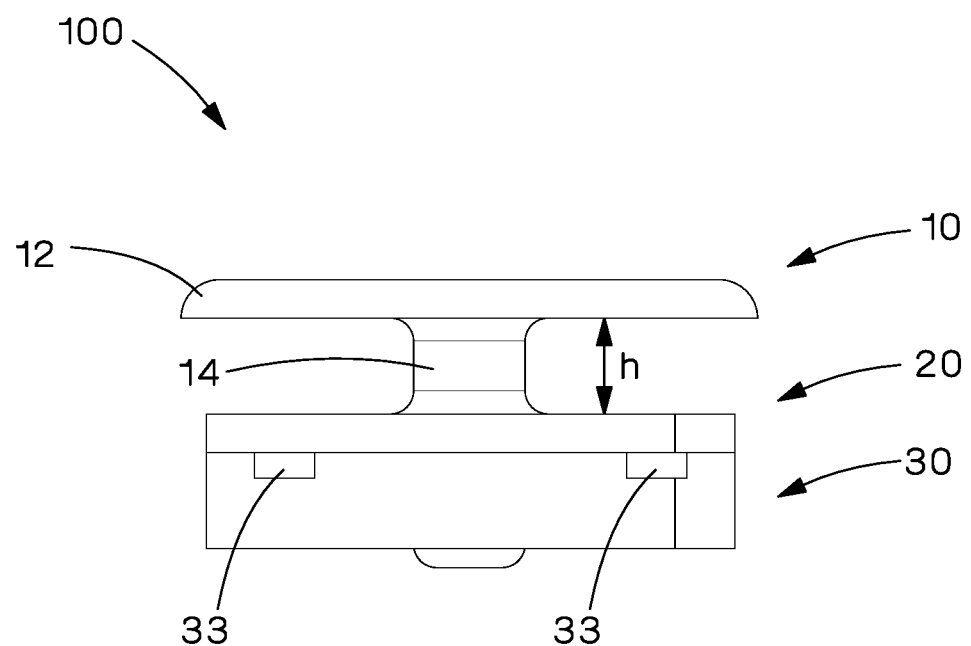
FIG. 4 is a first side view of the compliant hanger assembly shown in FIG. 1.
Figure 5:
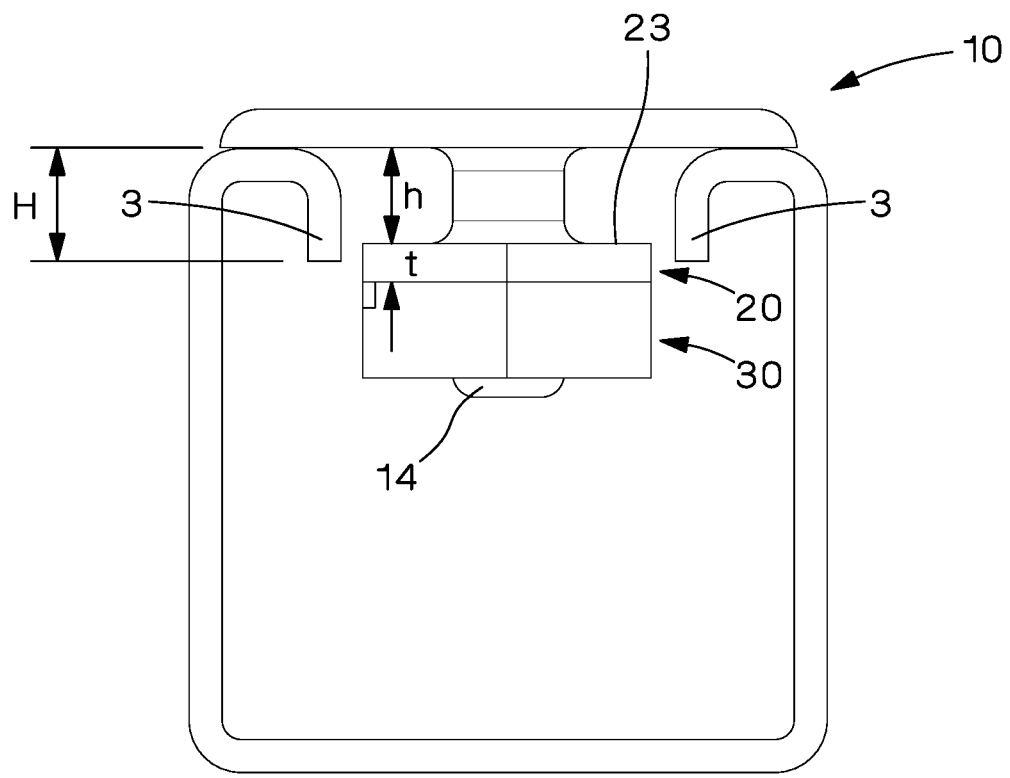
FIG. 5 is a second side view of the compliant hanger assembly shown in FIG. 4 during an installation onto the strut.

FIG. 3 illustrates a perspective view of the compliant hanger assembly 100 in an assembled state. FIG. 4 also illustrates the compliant hanger assembly 100 in the assembled state, where the view is taken from a first side view showing the width face of the strut nut 30 facing into the channel of the strut 2. The dual channels 33 are also visible in the first side view provided in FIG. 4. FIG. 5 shows the compliant hanger assembly 100 in the assembled state, where the view is taken from a second side view showing the length face of the strut nut 30 facing into the channel of the strut 2.

As shown in FIG. 4, there is a space between the top head 12 and the compression pad 20 having a height (h). As shown in FIG. 5, the height (h) of the space between the top head 12 and the compression pad 20 is slightly less than the height (H) of the installation protrusion 3. The difference in height (h) and height (H) is within a range corresponding to the thickness (t) of the compression pad 20. By having these relative measurements, this allows the installation protrusions 3 to compress into the compression pad 20 as the compliant hanger assembly 100 is rotated to fit under the installation protrusions 3 of the strut 2 in a subsequent installation step, as shown in FIGS. 6 and 8.

Figure 7:
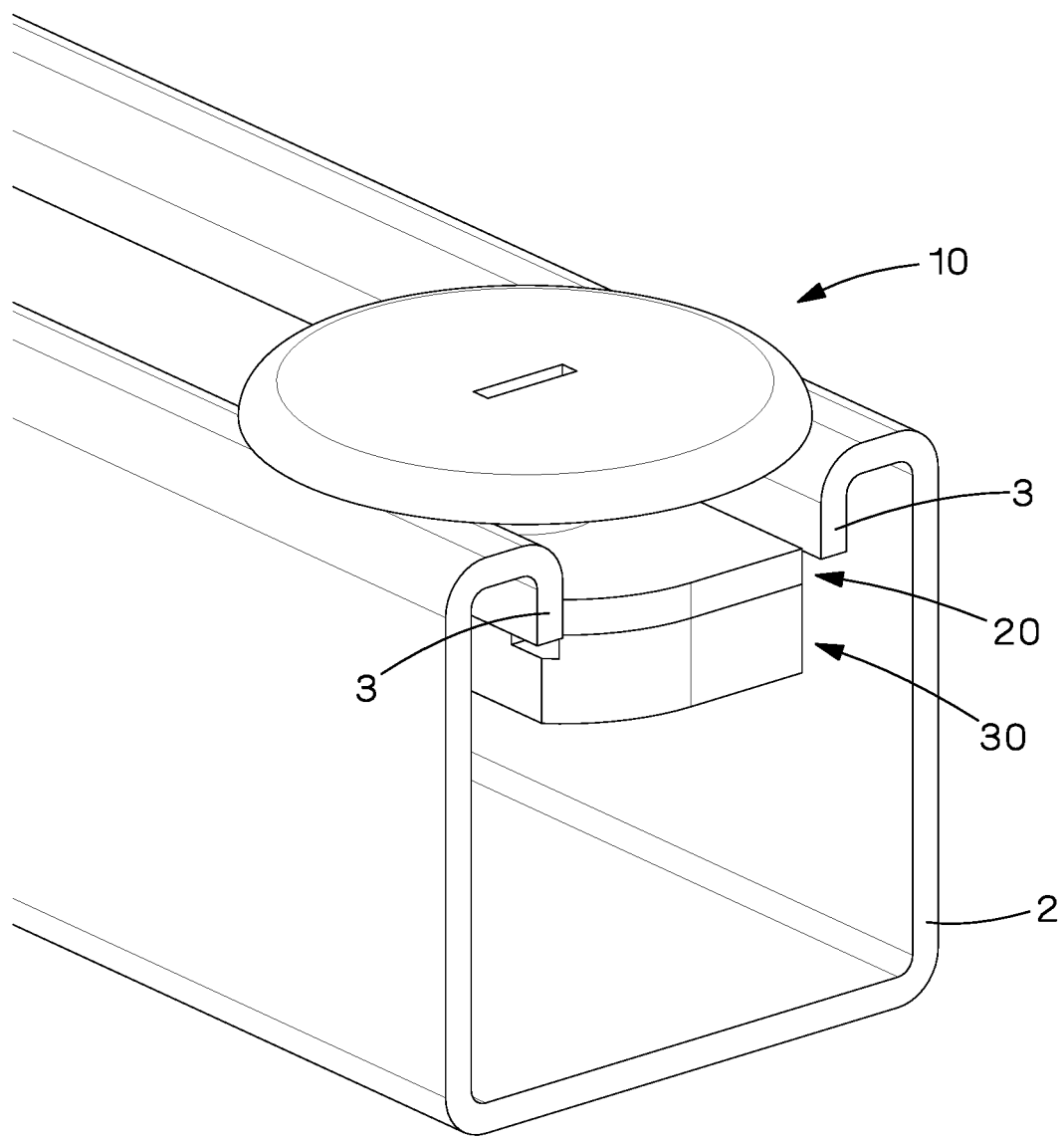
FIG. 7 is a perspective view of the compliant hanger assembly during an installation onto the strut corresponding to FIG. 5.

In describing the installation process, FIGS. 5 and 7 show different views of a first step in the installation process where the compliant hanger assembly 100 is fit within the channel of the strut 2. For example, FIG. 5 shows a side view of the strut nut 30 and the compression pad 20 dropped down into the channel of the strut 2 in an orientation where the length face of the strut nut 30 is facing into the channel of the strut 2. The strut nut 30 is dropped down in this orientation as the strut nut 30 will not fit down into the channel of the strut 2 when the strut nut 30 is rotated to show its width face into the channel of the strut 2. So according to this first step in the installation process, the strut nut 30 and the compression pad 20 are lowered down into the channel of the strut 2 in the orientation shown in FIGS. 5 and 7 until the bottom of the top head 12 abuts against the tops of the installation protrusions 3. FIG. 7 is a perspective view of the compliant hanger assembly 100 as it is dropped down into the channel of the strut 2 in an orientation where the length face of the strut nut 30 is facing into the channel of the strut 2.

According to a final installation step in the installation process, the compliant hanger assembly 100 is rotated 90 degrees (e.g., in the clock-wise direction) until the width face of the strut nut 30 is facing into the channel of the strut 2, as shown in FIGS. 6 and 8. As described earlier, the rounded corners 22 of the compression pad 20 and the rounded corners 32 of the strut nut 30 are positioned to aid in the rotation fit of the strut nut 30 and the compression pad 20 as they are rotated in the clock-wise direction within the channel of the strut 2.

FIGS. 6 and 8 show different views of the compliant hanger assembly 100 in the installed state. For example, FIG. 6 is a side view of the compliant hanger assembly 100 in the installed state where the width face of the strut nut 30 has been rotated to face into the channel of the strut 2. In this orientation, the compression pad 20 is compressed to fit, at least in part, the installation protrusions 3 towards the corresponding dual channels 33 of the strut nut 30. In the installed state, at least a portion of the compression pad 20 is shown to be deformed enough to protrude into the dual channels 33 of the strut nut 30. In this installed state, the compression pad 20 still has enough compression functionality leftover to provide additional compression and rebounding for when the MLT 50 is secured. According to some embodiments, at least a portion of the installation protrusions 3 may also be fitted within the dual channels 33 of the strut nut in this installed state.

FIG. 8 is a perspective view of the compliant hanger assembly 100 installed onto the strut 2. As shown in FIG. 8, the installed state of the compliant hanger assembly 100 provides a secure attachment of the compliant hanger assembly 100 to the strut 2. By achieving this secure attachment, the MLT 50 may be installed to go under and over the installed compliant hanger assembly 100 to secure the cable 1 on top of the top head 12 of the compliant hanger assembly 100, while still having enough compression and rebounding available from the compression pad 20 to effectively activate the MLT's 50 locking mechanism.

Figure 9:
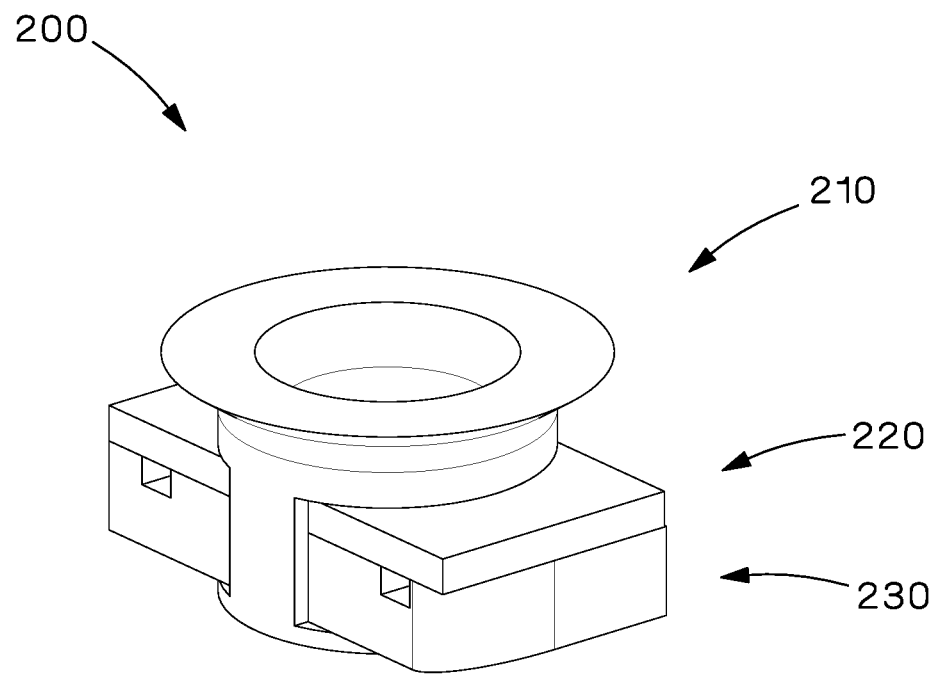
FIG. 9 is a perspective view of a compliant hanger assembly, according to another embodiment.

FIG. 9 is a perspective view of a compliant hanger assembly 200 in an assembled state, according to an alternative embodiment. The compliant hanger assembly 200 includes a hyperbolic strut nut 210, a compression pad 220, and a strut nut 230 (e.g., strut nut 230 may be same as strut nut 30).

Figure 13:
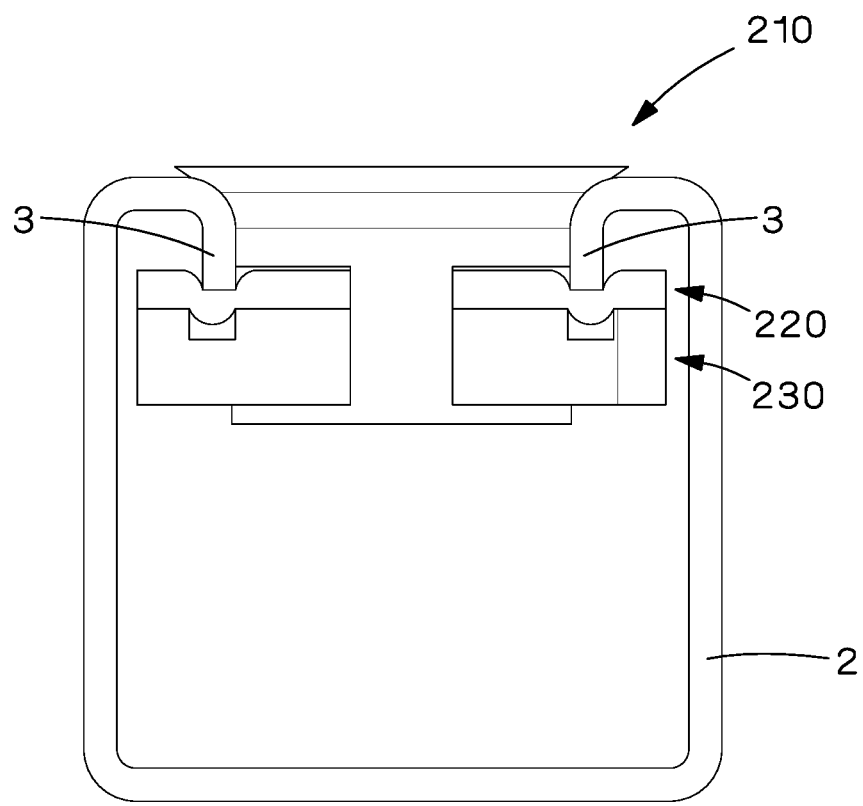
FIG. 13 is a side view of the compliant hanger assembly shown in FIG. 9 in an installed state onto the strut.

The hyperbola shape of the hyperbolic strut nut 210 may provide a more accurate fit when installed onto the strut 2, as shown in FIG. 13 which shows the compliant hanger assembly 200 installed onto the strut 2. By providing the more accurate fit when installed onto the strut 2, the hyperbolic strut nut 210 avoids leaving any substantial amounts of standing proud of the strut 2 (i.e., above the height of the installation protrusions 3 of the strut 2). This is advantageous as the hyperbolic strut nut 210 rests securely and stably onto the strut 2, while also preventing unwanted instability or movement that would be translated to the cable 1 later secured on top of the hyperbolic strut nut 210.

The hyperbolic strut nut 210 may be made from a plastic, or other polymer material. The hyperbolic strut nut 210 may be constructed using a roll-forming or other molding process. As shown in the partial exploded view of FIG. 10, the hyperbolic strut nut 210 includes a top radius table 211 having a flat top surface, a legs section 212, and a bottom ring 215. The inner portion of the top radius table 211 has an opening 213, and the hyperbolic strut nut 210 forms a port opening 214 for receiving and securing the compression pad 220 and strut nut 230 assembled together.

Figure 10:
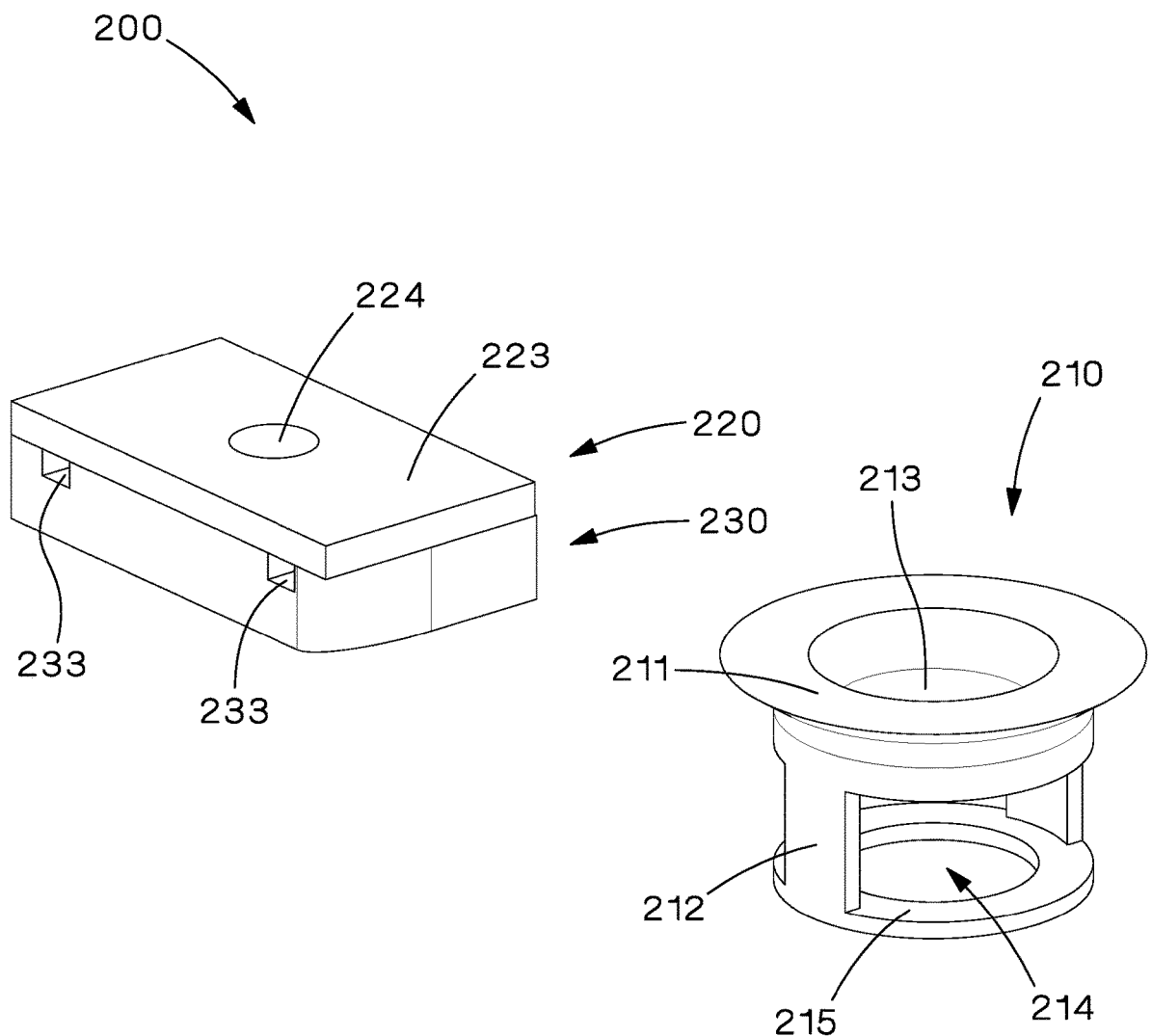
FIG. 10 is a partially exploded view of the compliant hanger assembly shown in FIG. 9.
Figure 11:
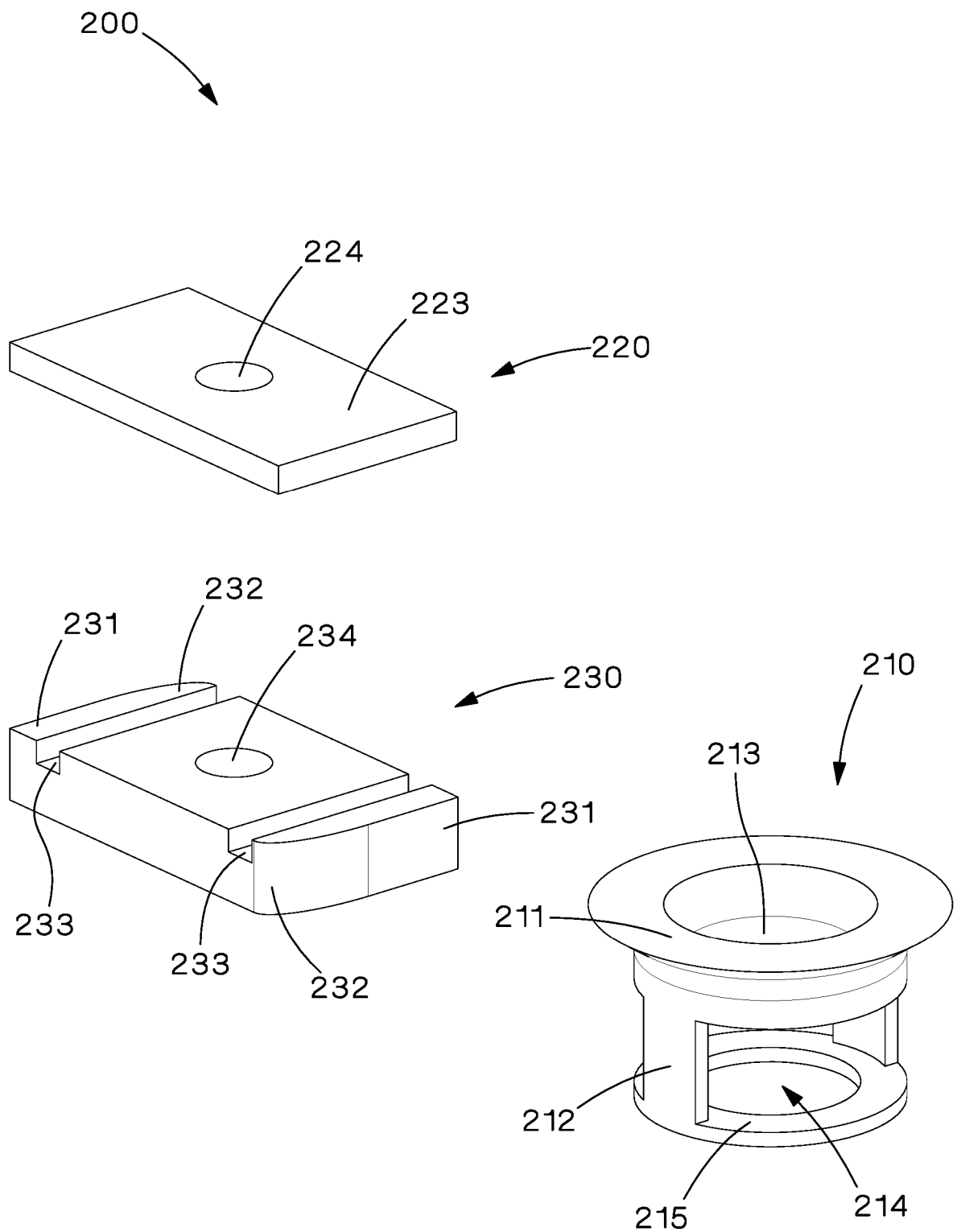
FIG. 11 is an exploded view of the compliant hanger assembly shown in FIG. 9.

The compression pad 220 is formed to have a substantially rectangular shape with all orthogonal edged corners as shown in FIG. 10, as well as an opening hole 224. However, according to other embodiments the compression pad 220 may include rounded corners and orthogonal edged corners as described for compression pad 20. The compression pad 20 is comprised of at least one of a foam material, polymer composition, rubber composition, or other deformable material. The strut nut 230 is the same as strut nut 30, and includes the dual channels 233. FIG. 11 is an exploded view of the compliant hanger assembly 200 showing the rounded corners 232 and the orthogonal edged corners 231, as well as a view of the threaded opening 234. According to some embodiments of the compliant hanger assembly 200, the compression pad 220 may not include the opening hole 224 and instead be a single flat piece when and the strut nut 230 being supported does not include the threaded opening 234.

Figure 12:
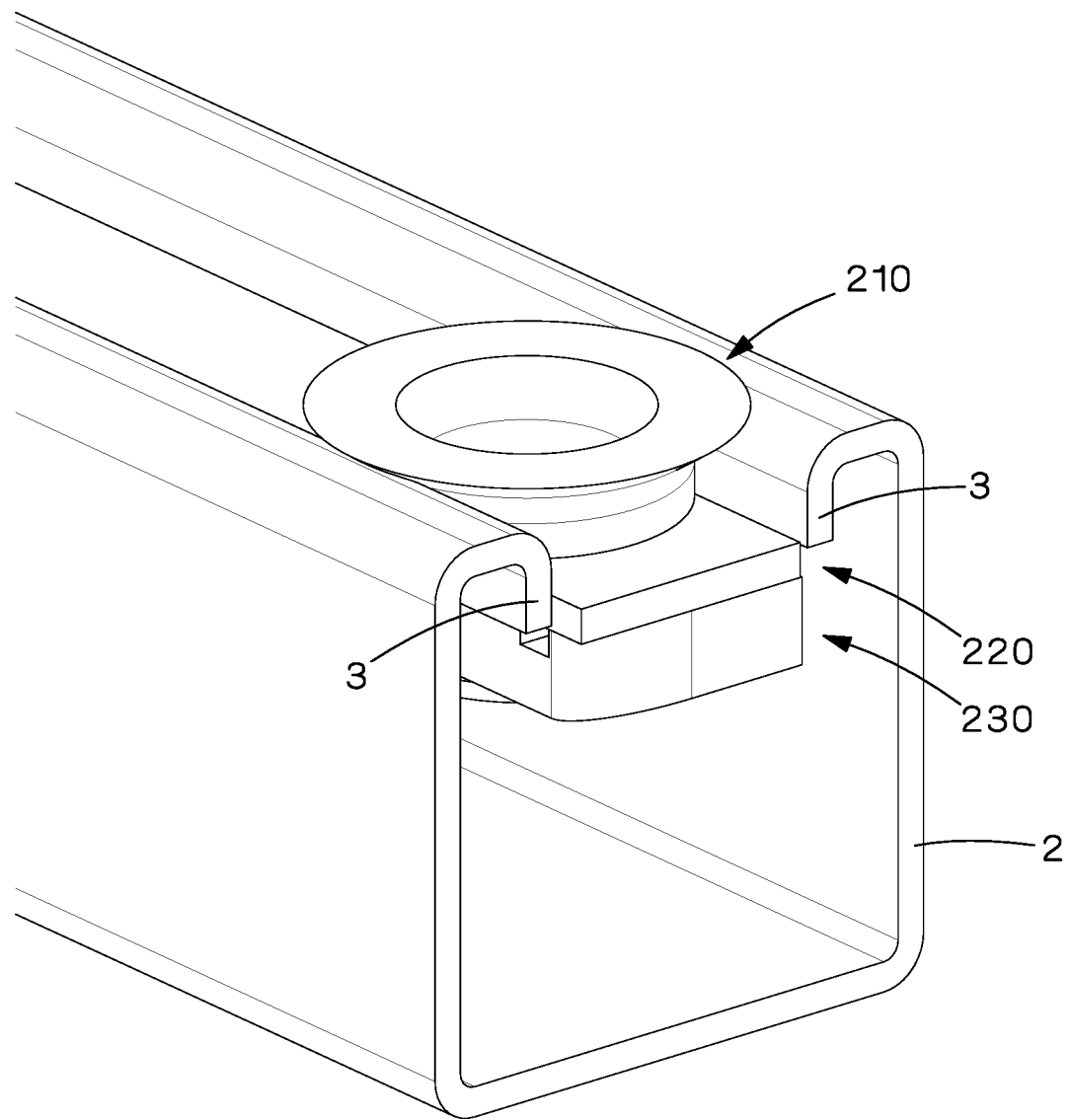
FIG. 12 is a perspective view of the compliant hanger assembly shown in FIG. 9 during an installation onto the strut.

FIG. 12 shows a perspective view of the compliant hanger assembly 200 in a first step of the installation process where the compliant hanger assembly 200 is fit within the channel of the strut 2. For example, FIG. 12 shows the strut nut 230 and the compression pad 220 dropped down into the channel of the strut 2 in an orientation where the length face of the strut nut 230 is facing into the channel of the strut 2. The strut nut 230 is dropped down in this orientation as the strut nut 230 will not fit down into the channel of the strut 2 when the strut nut 230 is rotated to show its width face into the channel of the strut 2. So according to this first step in the installation process, the strut nut 230 and the compression pad 220 are lowered down into the channel of the strut 2 in the orientation shown in FIG. 12 until the bottom of the top radius table 211 abuts against the tops of the installation protrusions 3.

Figure 14:
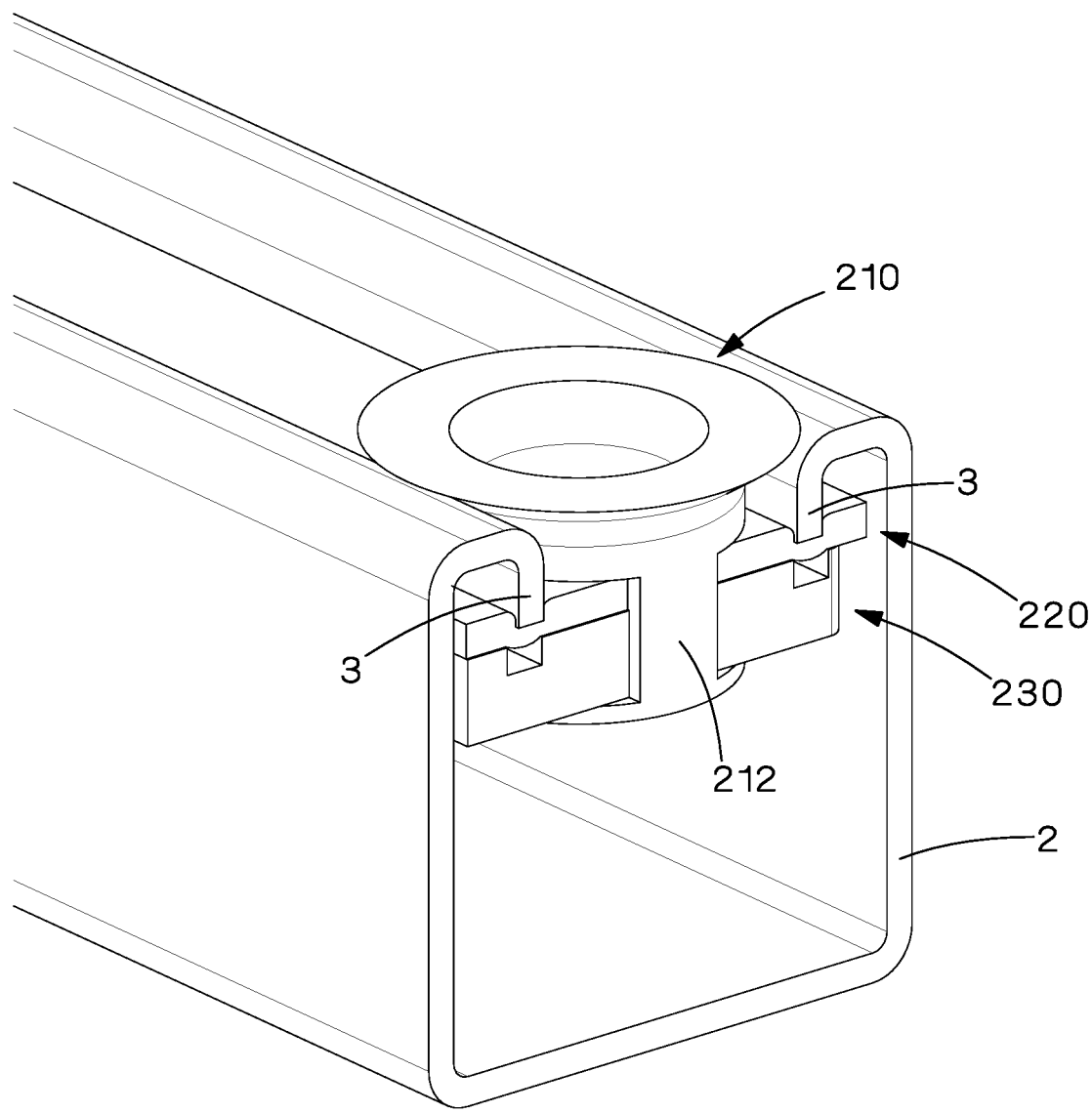
FIG. 14 is a perspective view of the compliant hanger assembly shown in FIG. 9 in an installed state onto the strut.

According to a final installation step in the installation process, the compliant hanger assembly 200 is rotated, for example in a clock-wise direction 90 degrees, until the width face of the strut nut 230 is facing into the channel of the strut 2, as shown in FIG. 13 and FIG. 14. As described earlier, the rounded corners 232 of the strut nut 230 are positioned to aid in the rotation fit of the strut nut 230 as they are rotated into the clock-wise direction within the channel of the strut 2.

FIGS. 13 and 14 show different views of the compliant hanger assembly 200 in the installed stated. For example, FIG. 13 is a side view of the compliant hanger assembly 200 in the installed state where the width face of the strut nut 230 has been rotated to face into the channel of the strut 2. In this orientation, the compression pad 220 is compressed to fit, at least in part, the installation protrusions 3 towards the corresponding dual channels 233 of the strut nut 230. In the installed state, at least a portion of the compression pad 220 is shown to be deformed enough to protrude into the dual channels 233 of the strut nut 230. According to some embodiments, at least a portion of the installation protrusions 3 may also find their way to fit within the dual channels 233 of the strut nut.

FIG. 14 is a perspective view of the compliant hanger assembly 200 installed onto the strut 2. As shown in FIG. 14, the installed state of the compliant hanger assembly 200 provides a secure attachment of the compliant hanger assembly 200 to the strut 2. By achieving this secure attachment, the MLT 50 may be installed to go under and over the installed compliant hanger assembly 200 to secure the cable 1 on top of the top radius table 211 of the compliant hanger assembly 200, similar to the assembly shown in FIG. 1.

Figure 16:
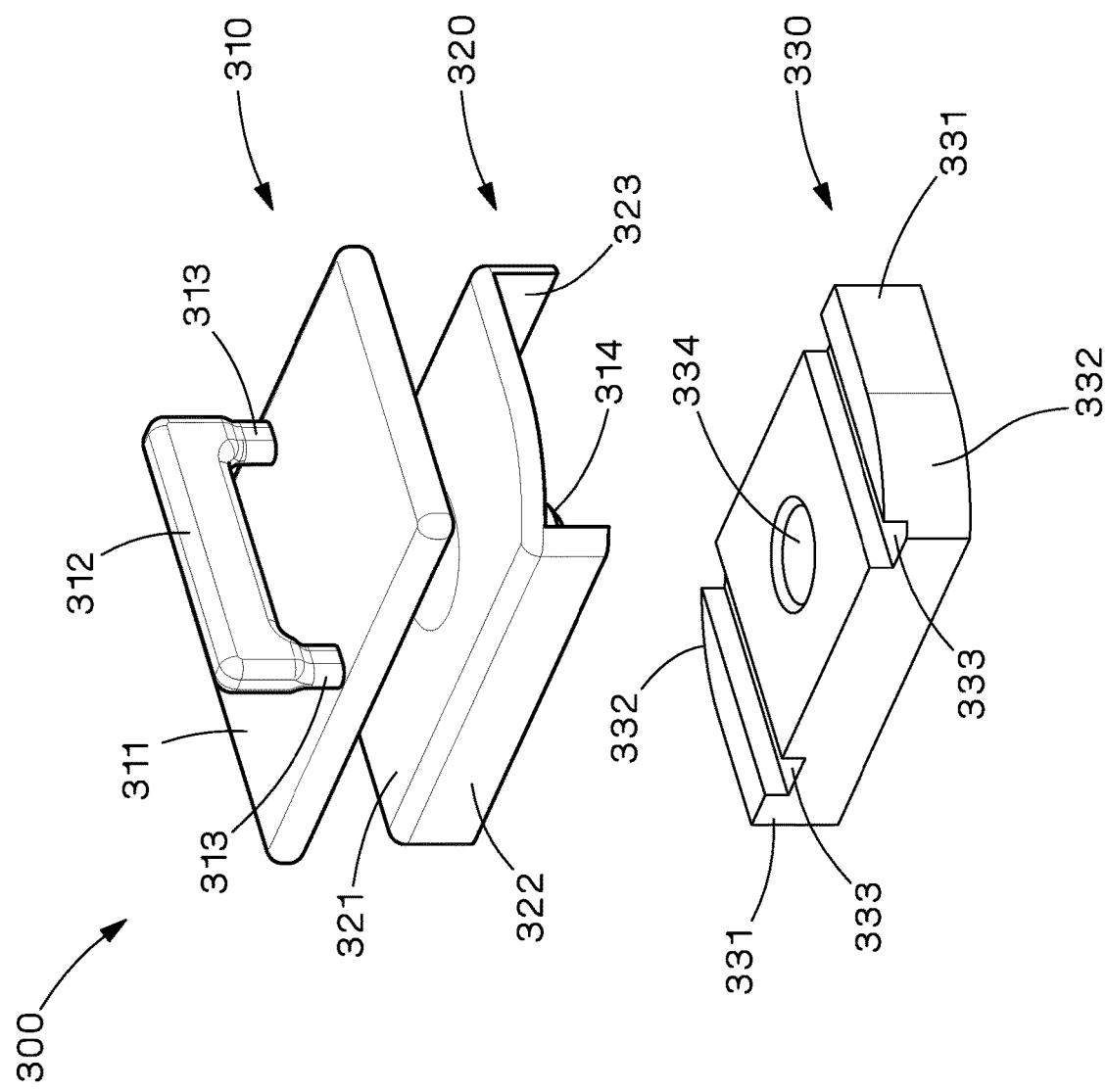
FIG. 16 is an exploded view of a compliant hanger assembly, according to another embodiment.

FIG. 16 is a perspective exploded view of a compliant hanger assembly 300, according to an alternative embodiment. The compliant hanger assembly 300 includes a top hanger 310 and a compliant member 320, and a strut nut 330.

Figure 20:
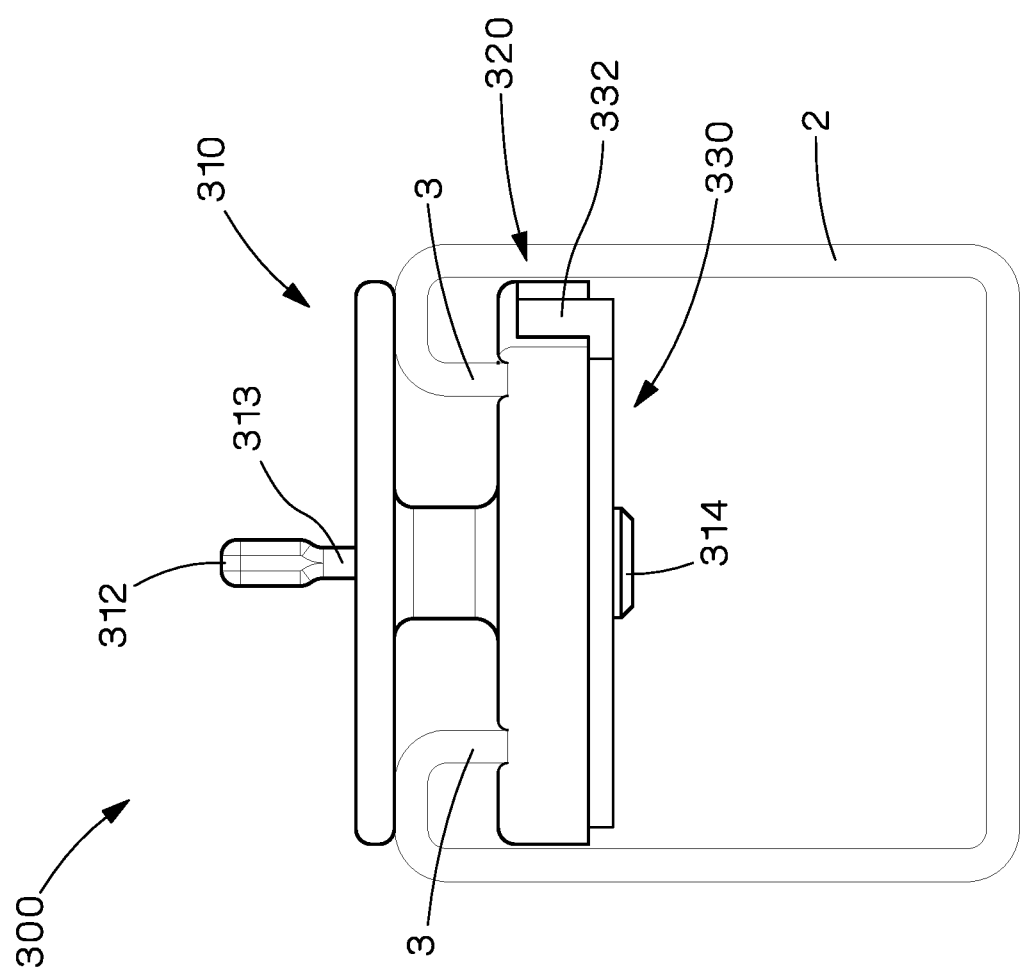
FIG. 20 is a first side view of the compliant hanger assembly shown in FIG. 16 in an installed state onto the strut.
Figure 23:
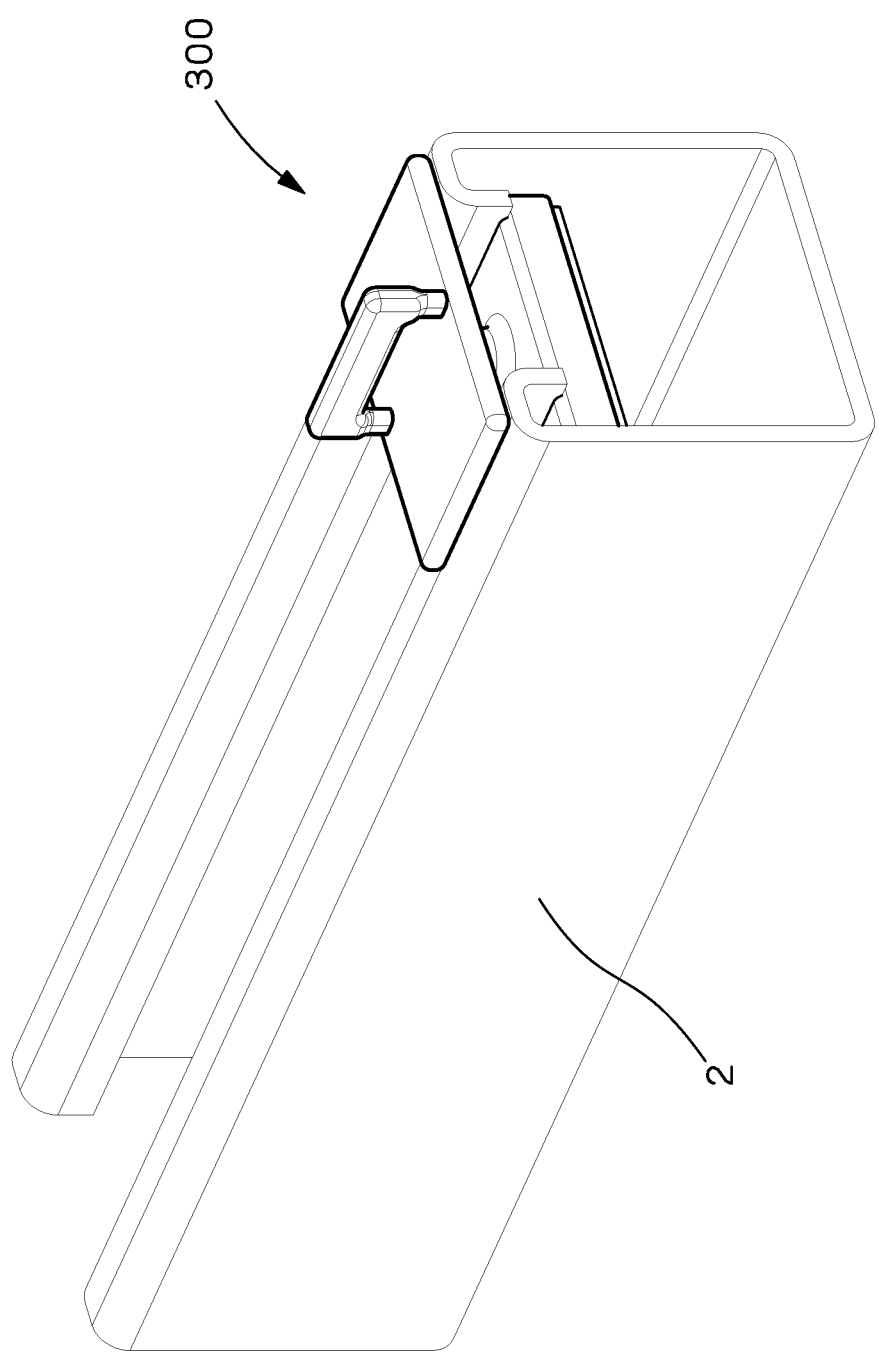
FIG. 23 is a perspective view of the compliant hanger assembly shown in FIG. 16 in an installed state onto the strut.

The top hanger 310 is formed to include a flat top surface 311 upon which the cable 1 will sit on top of when secured using the MLT 50. According to other embodiments, the shape of the flat top surface 311 may be replaced with a curved concave shape to receive and better match the curvature of the cable(s) being secured to it. The top hanger 310 includes a stem 314, which may be a threaded stem, where the stem 314 is configured to fit within a threaded hole 334 included in the strut nut 330. The top hanger 310 also includes a handle 312 that is detachable at two detachment arms 313, as described in more detail herein. The handle 312 is included to provide a user with a rotation mechanism that does not require the use of a separate tool. The shape of the handle 312 allows the user to apply a rotational torque to the handle 312 which may further translate to rotate the compliant hanger assembly 300 into an installed state on to the strut 2, as shown in FIGS. 20 and 23. As described, the stem 334 may be threaded or unthreaded according to some embodiments, where the stem 314 has a diameter that securely fits into the diameter of the threaded hole 334 of the strut nut 330 (e.g., the diameter of the stem 14 is slightly larger than the diameter of the threaded hole 34). With these relative dimensions, the interaction of the stem 314 and the threaded hole 334 as the stem 314 is inserted into the threaded hole 334 keeps the top hanger 310 attached to the strut nut 330.

The strut nut 330 includes the threaded hole 334 for receiving the stem 314. The strut nut 330 also has the substantially rectangular shape. The strut nut 330 also includes rounded corners 332 at two diagonally opposite corners, and orthogonal edged corners 331 at the other two diagonally opposite corners. The rounded corners 332 of the strut nut 330 are designed to make installation onto the strut 2 more efficient as the compliant hanger assembly 300 is rotated into an installed state onto the strut 2, as will be described in more detail below. The strut nut 330 further includes dual channels 333, where the dual channels 333 are positioned and shaped to receive the dual installation protrusions 3 of the strut 2, as shown in FIGS. 20 and 23.

Figure 17:
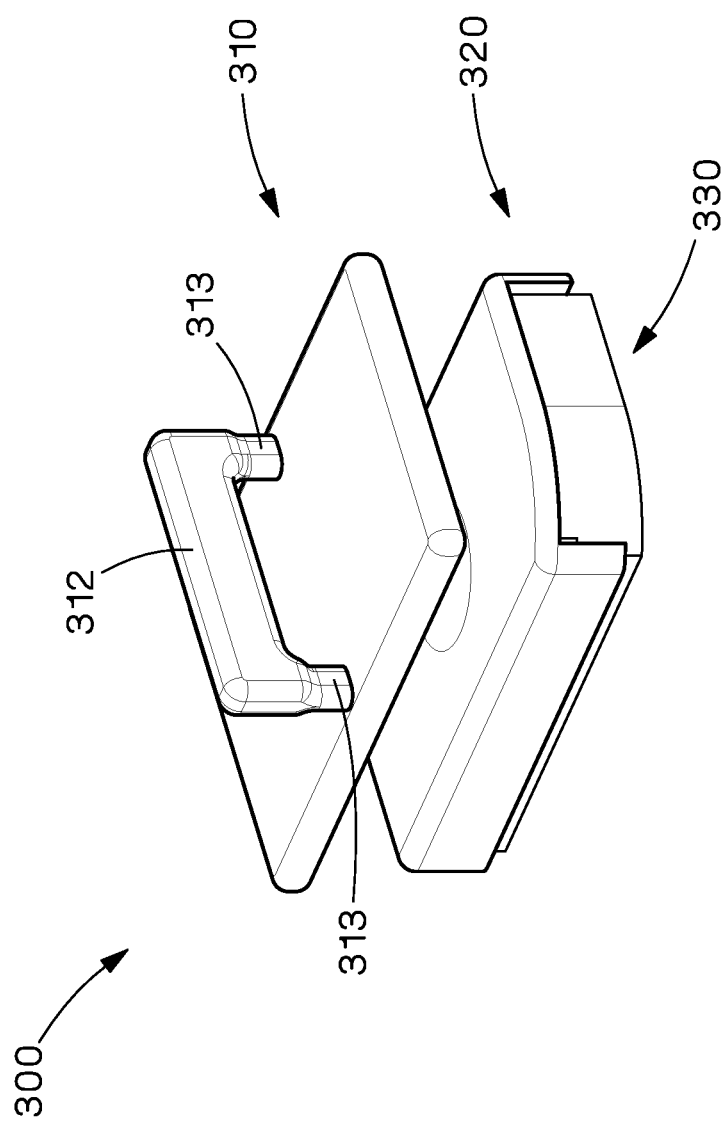
FIG. 17 is a perspective view of the compliant hanger assembly shown in FIG. 16 in an assembled state.

FIG. 17 is a perspective view of the compliant hanger assembly 300 in an assembled state. In the assembled state, the stem 314 is securely fitted within the threaded hole 334 of the strut nut 330, and the compliant member 320 covers at least the top and two sides (e.g., two long sides) of the strut nut 330. To cover the top of the strut nut 330, the compliant member includes a flat top surface. To cover the two sides of the strut nut 330, the compliant member 320 includes two skirts 322, 323 on opposite sides. The skirts 322, 323 provide a mechanism for securing the strut nut 330 to the strut 2, and also helps to keep the strut nut 330 from rotating while inside the strut channel without the intended rotational torque being applied to twist the strut nut 330 90 degrees during an installation process, as described in more detail herein.

According to some embodiments, the top hanger 310, stem 314, and the compression member 320 may be manufactured (e.g., molded) as a single piece. The compression member 320 is made from a material with physical characteristics that provides reboundable compression when the MLT 50 is being tensioned to secure the cable 1, and rebounding expansion that recovers at least some of its shape to provide the anti-tension in the MLT 50 that activates the locking mechanism of the MLT 50 and prevents further loosening of the cable tie body 51. It follows that the compression member 320 is comprised of at least one of a foam material, polymer composition, rubber composition, other deformable and rebounding material, or a combination thereof.

Figure 18:
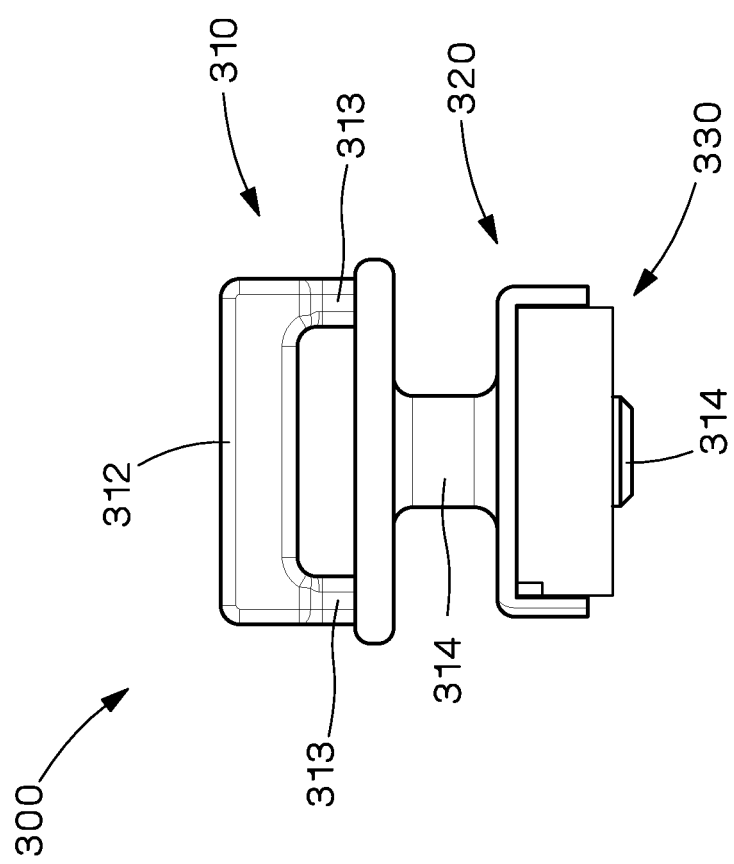
FIG. 18 is a second side view of the compliant hanger assembly shown in FIG. 17.
Figure 19:
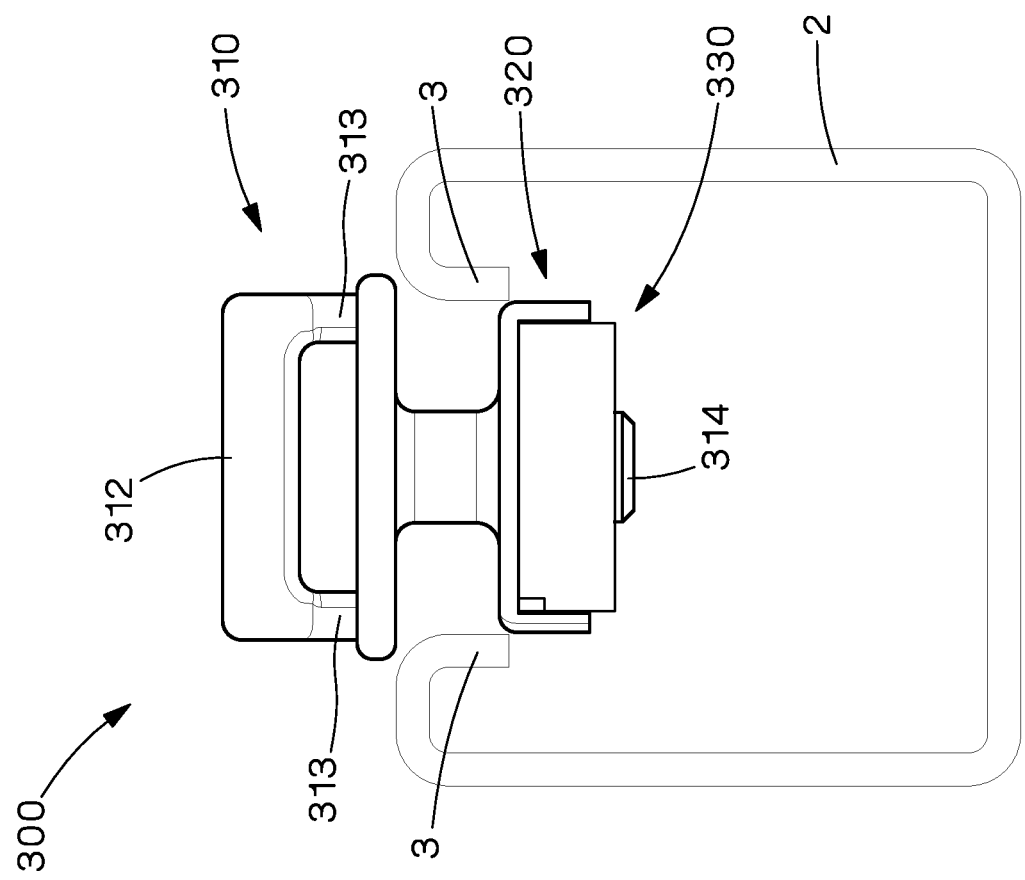
FIG. 19 is a second side view of the compliant hanger assembly shown in FIG. 17 during an installation onto the strut.
Figure 21:
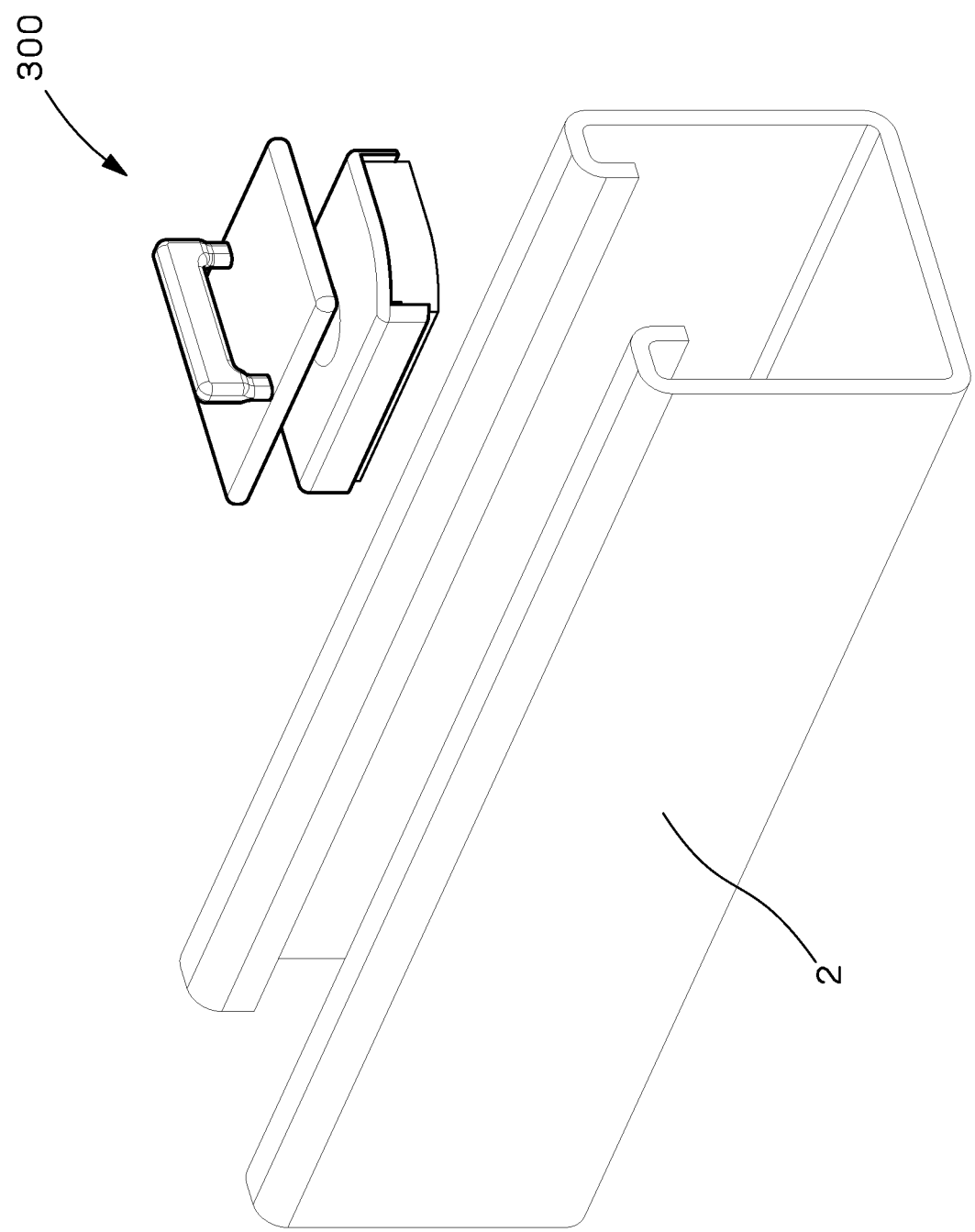
FIG. 21 is a perspective view of the compliant hanger assembly shown in FIG. 16 during an installation onto the strut.
Figure 22:
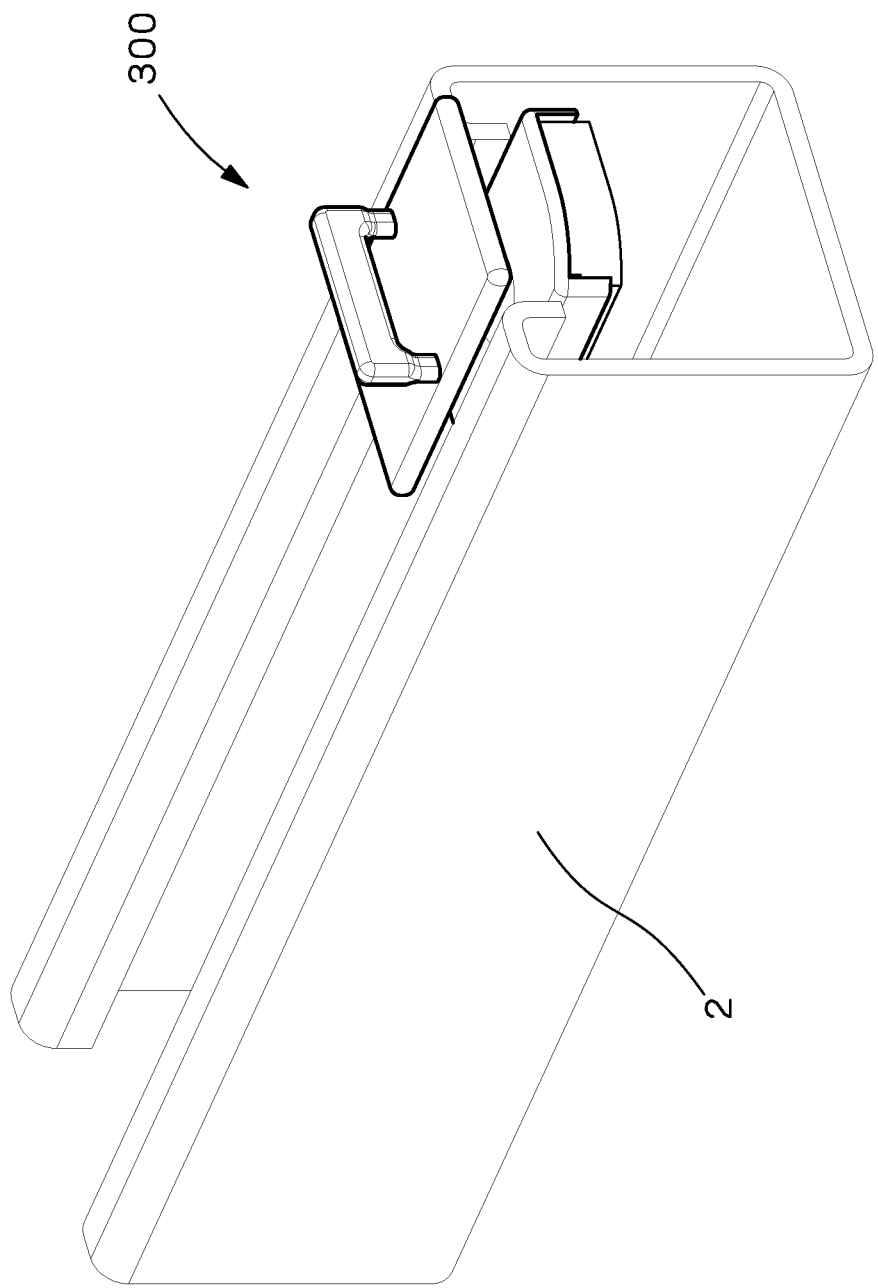
FIG. 22 is a perspective view of the compliant hanger assembly shown in FIG. 16 during an installation onto the strut.

FIG. 18 is a second side view of the compliant hanger assembly 300 in the assembled state, where the second view is taken to show the length face. As a first step in the installation of the compliant hanger assembly 300 into the strut 2, the compliant hanger assembly 300 is lowered into the channel of the strut 2 so that the length face is facing into the channel, as shown in FIG. 19. FIGS. 21 and 22 also show a perspective view of the first installation step as the compliant hanger assembly 300 is lowered into the channel of the strut 2 with the length face of the compliant hanger assembly facing into the channel. As with the compliant hanger assembly 100, a height of the space between the top hanger 310 and the compliant member 320 is slightly less than the height of the installation protrusions 3 included in the strut. This difference in heights is within a range corresponding to the thickness (t) of the compliant member 320, and by having these relative measurements, this allows the installation protrusions 3 to compress into the compliant member 320 as the compliant hanger assembly 300 is rotated to fit under the installation protrusions 3 of the strut 2 in a subsequent installation step, as shown in FIGS. 20 and 23.

According to a next, final, step in the installation process of the compliant hanger assembly 300 into the strut 2, the compliant hanger assembly 300 is rotated 90 degrees (e.g., in the clock-wise direction) until the width face of the strut nut 330 is facing into the channel of the strut 2, as shown in FIGS. 20 and 23. The rotational force to turn the strut nut 330 is applied to the handle 312.

FIG. 20 is a side view of the compliant hanger assembly in the installed state where the width face of the strut nut 330 has been rotated to face into the channel of the strut 2. In this orientation, portions of the compliant member 320 laying on the top surface (i.e., surface with the dual channels 333) are compressed by the corresponding installation protrusions 3 as the strut nut 330 is rotated to have its width face be facing into the strut channel. In the installed state, the installation protrusions 3 will push into the dual channels 333 of the strut nut 330 such that at least in part of the compliant member 320 will protrude into the corresponding dual channels 333 of the strut nut 330. In this installed state, the compliant member 320 still has enough compression functionality leftover to provide additional compression and rebounding for when the MLT 50 is secured. According to some embodiments, at least a portion of the installation protrusions 3 may also be fitted within the dual channels 333 of the strut nut in this installed state.

FIG. 23 is a perspective view of the compliant hanger assembly 300 installed onto the strut 2. In the installed state the compliant hanger assembly 300 provides a secure attachment of the compliant hanger assembly 300 to the strut 2. By achieving this secure attachment, the MLT 50 may be installed to go under and over the installed compliant hanger assembly 100 to secure the cable 1 on top of the top head 12 of the compliant hanger assembly 100, while still having enough compression and rebounding available from the compliant member 320 to effectively activate the MLT's 50 locking mechanism.

After installation of the compliant hanger assembly 300 onto the strut 2, the handle 312 is removed from the top hanger 310 at the detachment arms 313. The handle 312 may be manually removed by twisting the handle 312 to cause detachment at the detachment arms 313.

Figure 24:
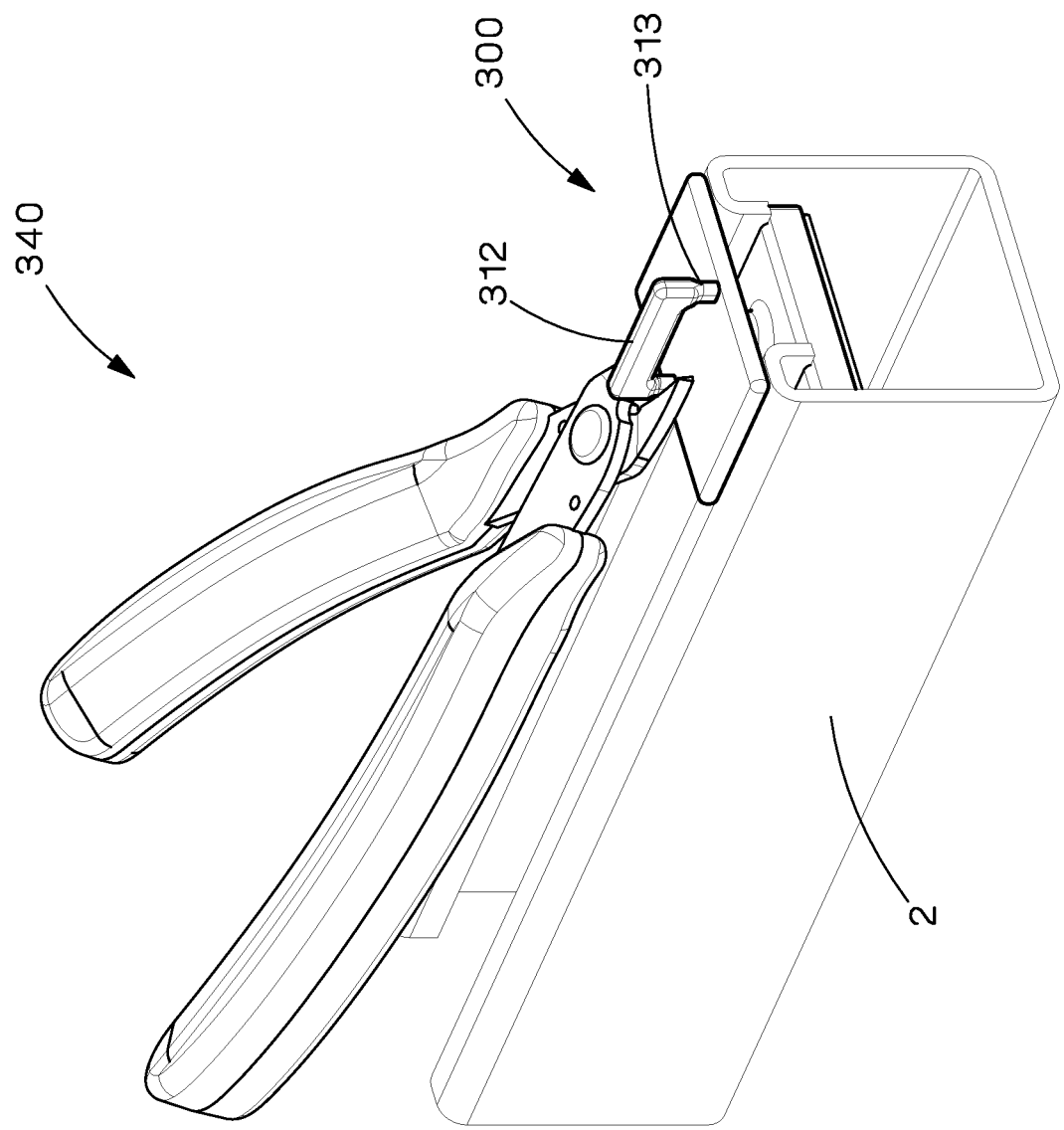
FIG. 24 is a perspective view of the compliant hanger assembly shown in FIG. 16 where a tool is used to remove a top handle.

Alternatively, a detachment tool 340 as shown in FIG. 24 may be used to clip the detachment arms 313. Following removal of the handle 312 from the top hanger 310, the cable 1 may be bundled to the compliant hanger assembly 300 using the MLT 50 (e.g., as shown in FIG. 1).

Figure 25:
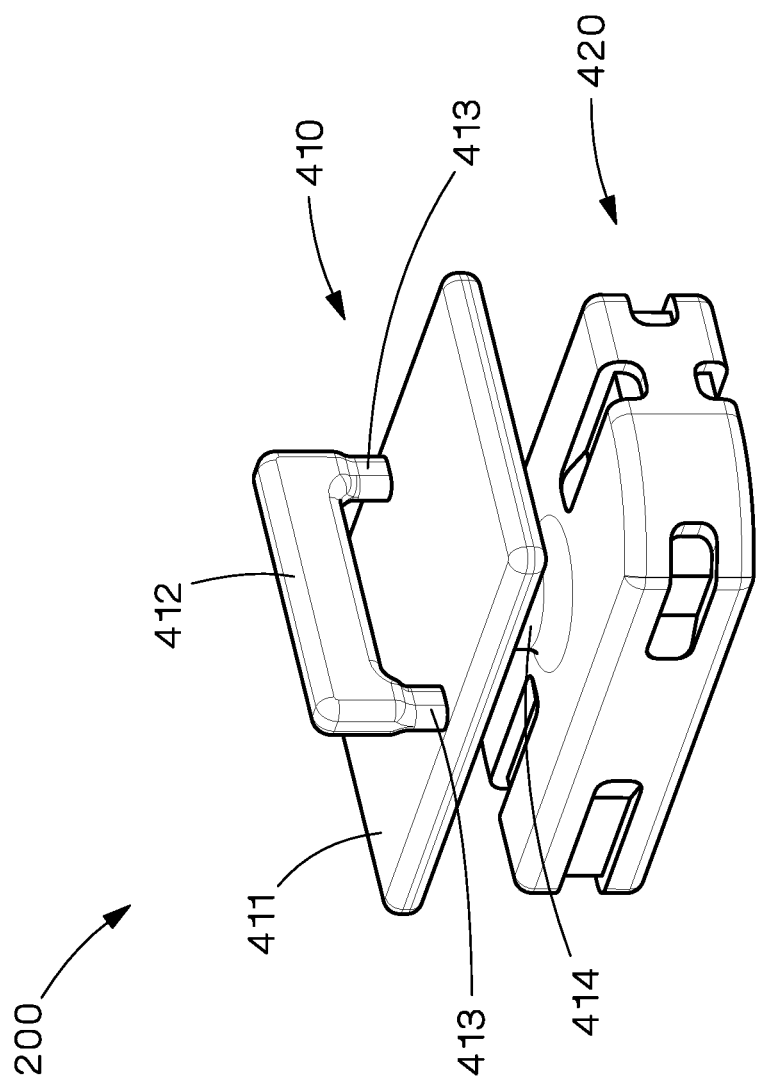
FIG. 25 is a perspective view of a compliant hanger assembly, according to another embodiment.

According to some embodiments, the compliant member 320 may include four total skirts to cover all four sides of the strut nut 330. According to some other embodiments, the compliant member 320 may be formed to cover all sides of the strut nut 330, as shown in FIG. 25. In FIG. 25, an alternative embodiment of the compliant hanger assembly 400 is shown where the compliant member 420 covers all sides of the strut nut 330 (not shown as it is enclosed by the compliant member 420. In the compliant hanger assembly 400, the top hanger 410 is the same as the top hanger 310. It follows that the top hanger 410 includes a flat top surface 411 upon which the cable 1 will sit on top of when secured using the MLT 50. According to other embodiments, the shape of the flat top surface 411 may be replaced with a curved concave shape to receive and better match the curvature of the cable(s) being secured to it. The top hanger 410 includes a stem 414, which may be a threaded stem, where the stem 414 is configured to fit within a threaded hole (not shown) included in the strut nut 330. The top hanger 410 also includes a handle 412 that is detachable at two detachment arms 413, as described in more detail herein. According to some embodiments the top hanger 410 and the strut nut 330 may be formed (e.g., molded) as a single piece, and the compliant member 420 is placed over the strut nut 330. The compliant member 420 is made from the same material as the compliant member 320.

Furthermore, while the particular embodiments described herein have been shown and described, it will be obvious to those skilled in the art that changes and modifications may be made without departing from the teachings of the compliant hanger assembly described herein. The matter set forth in the foregoing description and accompanying drawings is offered by way of illustration only and not as limitation. The scope of the different embodiments described herein are intended to be defined in the following claims when viewed in their proper perspective.

What is claimed is:

1. A compliant hanger assembly comprising:
    a top hanger;
    a compliant member, wherein the compliant member includes rounded corners and orthogonal edge corners; and
    a strut nut, wherein the compliant member is positioned on top of the strut nut to be between the top hanger and the strut nut.

2. The compliant hanger assembly of claim 1, wherein the top hanger comprises:
    a top head formed in a circular shape; and
    a stem configured to be secured to the strut nut.

3. The compliant hanger assembly of claim 1, wherein the compliant member is comprised from one of a foam material, a polymer composition, or a rubber composition.

4. The compliant hanger assembly of claim 1, wherein the top hanger includes a driver hole shaped to receive a driver tool.

5. The compliant hanger assembly of claim 1, wherein the compliant member is a compression pad.

6. The compliant hanger assembly of claim 1, wherein the compliant member comprises a flat component configured to lay on top of the strut nut, a first side skirt configured to cover a first side surface of the strut nut, and a second side skirt configured to cover a second side surface of the strut nut.

7. The compliant hanger assembly of claim 1, wherein the compliant member is configured to fully cover the strut nut.

8. The compliant hanger assembly of claim 1, wherein the top hanger, the compliant member, and the strut nut are formed as a single component.

9. The compliant hanger assembly of claim 1, wherein the top hanger further comprises a detachable handle.

10. The compliant hanger assembly of claim 1, wherein the top hanger comprises a flat top surface.

11. The compliant hanger assembly of claim 1, wherein the top hanger comprises a curved concave shaped top surface.

12. A compliant hanger assembly comprising:
    a hyperbolic strut nut, wherein the hyperbolic strut nut has a hyperbolic shape configured to form fit onto installation protrusions of a strut;
    a compression pad; and
    a strut nut, wherein the compression pad is positioned on top of the strut nut and contacts a portion of a strut when the compliant hanger assembly is installed onto the strut.

13. The compliant hanger assembly of claim 12, wherein the hyperbolic strut nut comprises:
    a top radius table;
    a legs section; and
    a bottom ring, wherein the top radius table, the legs section, and the bottom ring form a port opening for receiving the strut nut.

14. The compliant hanger assembly of claim 12, wherein the compression pad includes rounded corners and orthogonal edge corners.

15. The compliant hanger assembly of claim 12, wherein the compression pad is comprised from at least one of a foam material, a polymer composition, or a rubber composition.

16. A compliant hanger assembly comprising:
a top hanger, wherein the top hanger further comprises a detachable handle;
a compliant member; and
a strut nut, wherein the compliant member is positioned on top of the strut nut to be between the top hanger and the strut nut.

17. The compliant hanger assembly of claim 16, wherein the top hanger includes a driver hole shaped to receive a driver tool.

18. The compliant hanger assembly of claim 16, wherein the compliant member is a compression pad.

19. The compliant hanger assembly of claim 16, wherein the top hanger comprises a flat top surface and a flat bottom surface.

20. The compliant hanger assembly of claim 16, wherein the top hanger comprises a curved concave shaped top surface.

* * * * *